United States Patent
Ibrahim

(10) Patent No.: US 10,966,055 B1
(45) Date of Patent: Mar. 30, 2021

(54) POSITIONING USING DISTRIBUTED ANTENNA SYSTEM WITH SERVICE AND LOCATION INFORMATION AVAILABILITY MONITORING AND DYNAMIC RECOVERY

(71) Applicant: LocationDAS INC., Falls Church, VA (US)

(72) Inventor: Ahmed Sallam Mohamed Ibrahim, Dubai (AE)

(73) Assignee: LocationDas INC., Falls Church, VA (US)

( * ) Notice: Subject to any disclaimer, the term of this patent is extended or adjusted under 35 U.S.C. 154(b) by 0 days.

(21) Appl. No.: 16/733,216

(22) Filed: Jan. 2, 2020

Related U.S. Application Data

(60) Provisional application No. 62/787,599, filed on Jan. 2, 2019.

(51) Int. Cl.
| | |
|---|---|
| *H04W 4/029* | (2018.01) |
| *H04B 7/022* | (2017.01) |
| *H04B 7/0413* | (2017.01) |
| *H04W 16/26* | (2009.01) |
| *H04B 7/06* | (2006.01) |

(Continued)

(52) U.S. Cl.
CPC ............ *H04W 4/029* (2018.02); *G06F 17/40* (2013.01); *H04B 7/022* (2013.01); *H04B 7/0413* (2013.01); *H04B 7/0671* (2013.01); *H04W 16/26* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 5,280,472 A | 1/1994 | Gilhousen et al. | |
| 5,513,176 A * | 4/1996 | Dean ................... | H04B 7/2643 370/335 |

(Continued)

FOREIGN PATENT DOCUMENTS

| | | |
|---|---|---|
| EP | 3091367 | 11/2016 |
| WO | WO2005103753 | 11/2005 |

(Continued)

OTHER PUBLICATIONS

US 8,848,633 B2, 09/2014, Chung et al. (withdrawn)

(Continued)

*Primary Examiner* — Ernest G Tacsik
(74) *Attorney, Agent, or Firm* — Aka Chan LLP

(57) ABSTRACT

System, devices, and methods facilitate determining positioning using distributed antenna system with service availability monitoring. Positioning methods include network based methods and handset assisted methods in addition to a monitoring system to report any service outage and possible location information loss. The system provides location information also at handset only level through application or apps and operating systems with online and off-line access to location database data. A combined monitoring system that monitors antenna output power for mobile coverage and service availability helps also in monitoring the availability of the localization system and dynamic update of lookup information. Monitoring system provides also asset tracking and service analytics features for the active or passive distributed antenna system.

77 Claims, 19 Drawing Sheets

(51) Int. Cl.
  *G06F 17/40* (2006.01)
  *H04W 64/00* (2009.01)

(56) References Cited

U.S. PATENT DOCUMENTS

| | | | |
|---|---|---|---|
| 6,236,365 B1 | 5/2001 | LeBlanc et al. | |
| 6,873,827 B1* | 3/2005 | Wright | H04W 24/00 |
| | | | 343/703 |
| 7,218,275 B2 | 5/2007 | Han | |
| 3,428,584 A1 | 4/2013 | Buckley et al. | |
| 8,983,301 B2 | 3/2015 | Baker et al. | |
| 9,001,811 B2 | 4/2015 | Wala et al. | |
| 9,158,864 B2 | 10/2015 | Berlin et al. | |
| 9,185,674 B2 | 11/2015 | Sauer | |
| 9,590,733 B2 | 3/2017 | George et al. | |
| 9,651,653 B2 | 5/2017 | Fischer et al. | |
| 2002/0115448 A1 | 8/2002 | Amerga et al. | |
| 2003/0125045 A1 | 7/2003 | Riley et al. | |
| 2003/0162550 A1 | 8/2003 | Kuwahara et al. | |
| 2005/0046458 A1* | 3/2005 | Schroeder | G06F 1/12 |
| | | | 327/276 |
| 2006/0246899 A1 | 11/2006 | Buckley et al. | |
| 2007/0004404 A1 | 1/2007 | Buckley et al. | |
| 2009/0131073 A1 | 5/2009 | Carlson et al. | |
| 2011/0009056 A1* | 1/2011 | Hanson | H04B 7/15528 |
| | | | 455/9 |
| 2012/0189074 A1* | 7/2012 | Jin | H04B 7/024 |
| | | | 375/267 |
| 2012/0322366 A1* | 12/2012 | Davies | H04B 7/12 |
| | | | 455/18 |
| 2013/0023285 A1 | 1/2013 | Markhovsky et al. | |
| 2013/0143598 A1 | 6/2013 | Srinivasan et al. | |
| 2013/0281125 A1 | 10/2013 | Schmidt | |
| 2015/0087329 A1 | 3/2015 | Stratford et al. | |
| 2015/0163634 A1* | 6/2015 | Meredith | H04L 67/22 |
| | | | 455/456.6 |
| 2016/0242044 A1* | 8/2016 | Han | H04B 17/27 |
| 2017/0164323 A1 | 6/2017 | Markhovsky et al. | |

FOREIGN PATENT DOCUMENTS

| | | |
|---|---|---|
| WO | WO2006076600 | 7/2006 |
| WO | WO2011123336 | 10/2011 |

OTHER PUBLICATIONS

Ibrahim, Ahmed Sallam Mohamed, A Study of DAS Delays and Their Impact on the Wireless Channels with Application to Indoor Localization, Thesis/Dissertation Collections, Aug. 2015, 99 pages, Rochester Institute of Technology, RIT Scholar Works, Dubai, Access from https://scholarworks.rit.edu/theses/8872.

Tong et al., Indoor Distributed Antenna Experiments, 2005, 5 pages.

Yanikomeroglu et al., CDMA Distributed Antenna System for Indoor Wireless Communications, Conference, 1993, 5 pages, Department of Electrical and Computer Engineering, Univeristy of Toronto, Toronto, Canada.

Sudhakar et al., Design of Distributed Antenna System Deployment for 2100 Mhz, International Journal of Innovative Research in Science, Engineering and Technology, Apr. 2014, pp. 312-318, vol. 3, Special Issue 4, www.ijirset.com, Ahmednagar, Maharastra, India.

3rd Generation Partnership Project, 3rd Generation Partnership Project; Technical Specification Group Radio Access Network; NG Radio Access Network (NG-RAN); Stage 2 functional specification of User Equipment (UE) positioning in NG-RAN (Release 15), Technical Specification, Sep. 2018, 63 pages, 3GPP TS 38.305, V15.1.0, Release 15, Valbonne, France.

* cited by examiner

Function of the DAS Sounder
- DAS Channel sounder in DL with location logging
- DAS Channel Sounder in UL with location logging
- Collective UL and DL channel sounding using frequency translation and retransmission in TRx 2 with location logging.
- Works with Any type of DAS. Passive Active and Hybrid.

Legend
1 DAS sounder TRx
2 DAS head end equipment and hubs
3 duplex cable pairs (2 core for uplink and downlink communication)
4 Channel controller. External or integrated with DAS head end (first stage)
5 DAS
6 Channel Controller. External or integrated with DAS HUB (2nd stage)
7 duplex cable pair or any other medium of transmission implemented in DAS hub (coaxial, twisted pair, etc)
8 DAS RF remote unit connected to DAS hub
9 DAS antenna connected to Remote unit using Coaxial cable.
10 DAS RF remote unit connected directly to first controller level
11 Coaxial cables.

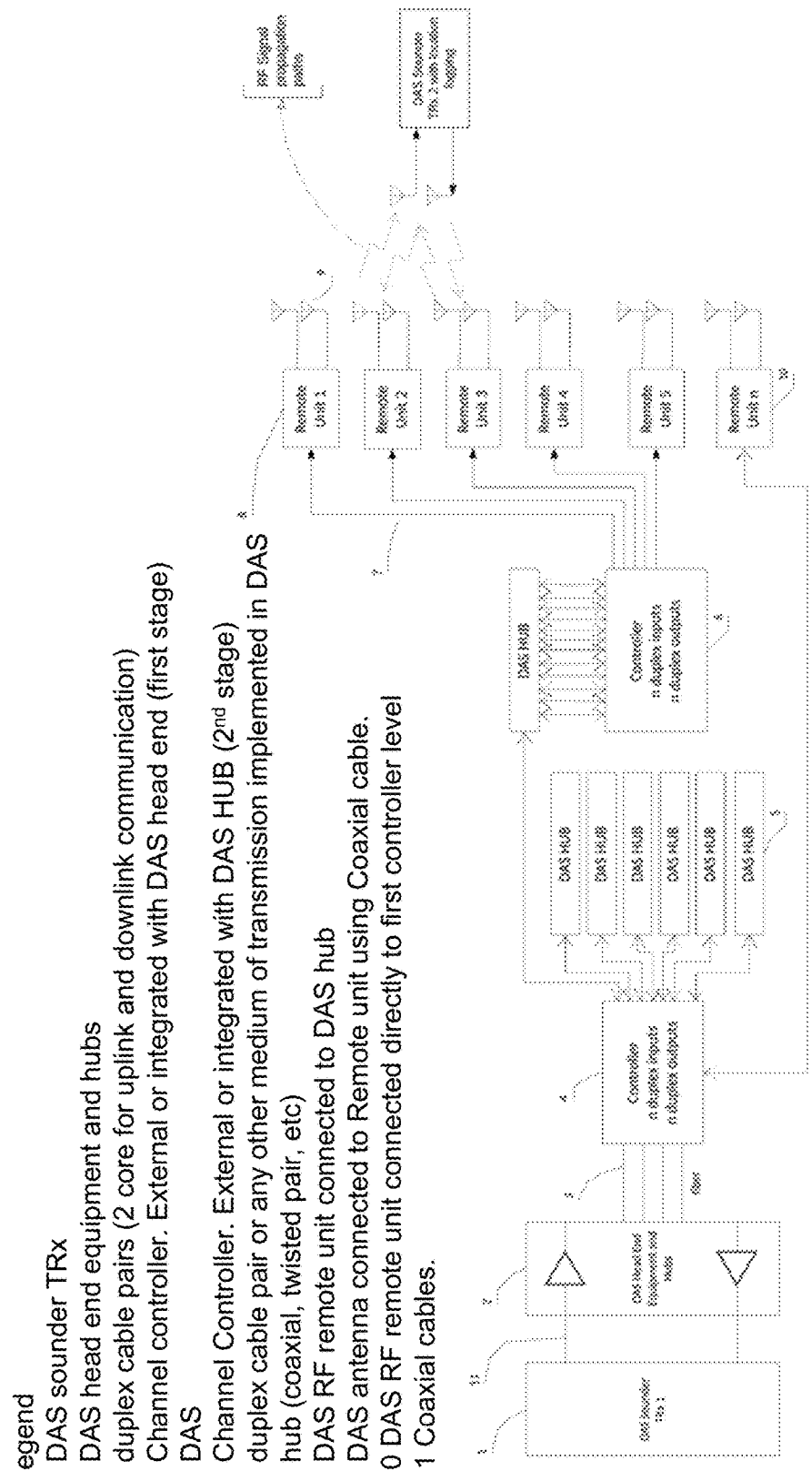

Figure 15

POSITIONING USING DISTRIBUTED ANTENNA SYSTEM WITH SERVICE AND LOCATION INFORMATION AVAILABILITY MONITORING AND DYNAMIC RECOVERY

CROSS-REFERENCE TO RELATED APPLICATIONS

This patent application claims the benefit of U.S. patent application 62/787,599, filed Jan. 2, 2019, which is incorporated by reference along with all other references cited in this application.

BACKGROUND OF THE INVENTION

The invention relates to the field of antennas, and more specifically, to determining a position or location of a wireless device based in a distributed antenna system.

Various techniques are available to determine the location or position of wireless devices such as a radios, mobile phones, or smartphones. These approaches have shortcomings such as not being able to find the position of a device in a relatively dense area, such as a room or suite in a high-rise building (e.g., 61-floor tower) in an urban area.

Therefore, there is a need for an improved system, devices, and methods of determining positioning using a distributed antenna system.

BRIEF SUMMARY OF THE INVENTION

System, devices, and methods facilitate determining positioning using distributed antenna system with service availability monitoring. Positioning methods include network based methods and handset assisted methods in addition to a monitoring system to report any service outage and possible location information loss. The system provides location information also at handset only level through application or apps and operating systems with online and off-line access to location database data. A combined monitoring system that monitors antenna output power for mobile coverage and service availability helps also in monitoring the availability of the localization system and dynamic update of lookup information. Monitoring system provides also asset tracking and service analytics features for the active or passive distributed antenna system.

In an implementation, a system includes: a first antenna, positioned at a first location inside a building; a second antenna, positioned at a second location inside the building; and a channel controller, including a first input, a second input, and an output, where the first antenna is connected to the first input, and the second antenna connected to a second input. The first and second locations can be on different floors of a building.

The channel controller includes a first configurable delay between the first input to the output and a second configurable delay between the second input to the output. The first configurable delay is selected to be different from the second configurable delay.

The system includes a receiver circuit, where the receiver circuit receives the output of the channel controller including a signal from the first antenna including the first configurable delay and a signal from the second antenna including the second configurable delay. Based on the received first configurable delay, the receiver circuit determines a signal is from the first antenna at the first location inside the building. And based on the received second configurable delay, the receiver circuit determines a signal is from the second antenna at the second location inside the building.

In various implementations, the first signal and second signal are radio frequency signals. The first configurable delay and second configurable delay are configured by a user (e.g., via a software interface screen). The first configurable delay and second configurable delay are created without introducing a physical delay via varying cable lengths. The first configurable delay and second configurable delay are created by way of a digital delay by way of using a digital signal processor (DSP) integrated circuit or field programmable gate array integrated circuit (FPGA). Also, the first configurable delay and the second configurable delay are not to minimize a multipath effect between the first antenna and the second antenna.

When the channel controller detects a signal loss of any of the antennas, there can be a trigger of a simulation of a lookup database to produce new set of data for lookup. The channel controller continuously produces a test signal outside the communication band to monitor any changes in the cable length. The channel controller compares the value with stored baseline values of cable lengths to trigger an alarm when these values are changed for all connected signal paths.

The system can include a channel sounder circuit, where the channel sounder circuit wireless interacts with the channel controller and receiver circuit, performing continuous tests on fiber, coaxial, and over the air channel components with result correlated to a physical position.

There can be a location logger channel sounder, where the location logger channel sounder detects channel anomaly and reports a physical change on infrastructure. Based on the location logger channel sounder, the channel controller can calibrate and auto adjust based on delays to deliver a desired channel impulse response (CIR) per location via an automated procedure at infrastructure commissioning stage and adjusting phase for baseline creation.

The system can include a DAS channel sounder in downlink with location logging and a DAS channel sounder in uplink with location logging, wherein a collective uplink and downlink channel sounding using frequency translation and retransmission in a transceiver with location logging. The system can include DAS software design tools, wherein the DAS software design tools assists in a determining a positioning of the antennas. There can be hardware tools and digital software methods, wherein the hardware tools and digital software methods implement recommended delays on the transmission antennas.

A technique involves optimizing a distributed antenna system which will allow, for example, mobile operators to detect the location of a particular wireless user. A distributed antenna system design method can be aided by design tools and can be automated. Some examples of design tools include IBwave and iBUILDNET.

There can be hardware tools and digital software methods to implement recommended delays on the DAS transmission antennas. This can relate to DAS vendors who can benefit by offering a unique indoor location ability to their DAS systems. This includes digital DAS vendors and analog DAS vendors. A digital DAS includes all variants of digital such as software defined ratios and digital RF over fiber can implement the required or desired delays digitally into their system, requiring no additional hardware. An analog hardware controller can benefit both digital and analog DAS vendors.

For a mobile operator network, the mobile operator may have a standard location determination method. A technique can help implementing these same methods for an indoor portion of the system with successful and reproducible results. Mobile location server software vendors can also benefit from the technique by implementing a lookup table that is generated by the design software and process. This system and technique will greatly improve and optimize the results as compared to previous approaches.

There are test tools to perform model tuning and verify designed parameters to calibrate results. The approach can also create fingerprints to populate a fingerprint database.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 15 shows a distributed antenna system sounder interaction with a distributed antenna system.

DETAILED DESCRIPTION OF THE INVENTION

Figure 1A:
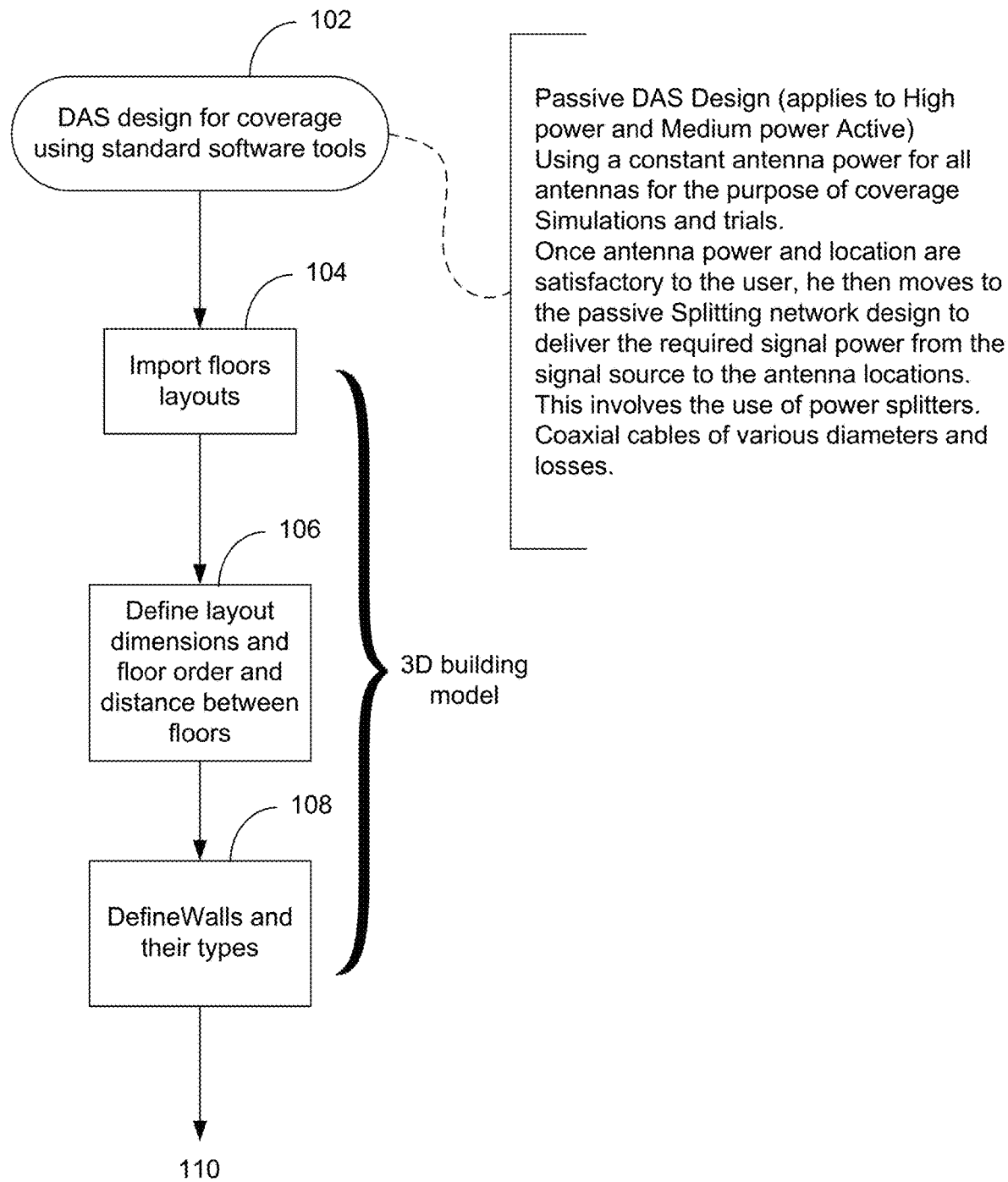
FIGS. 1A-1C show a design process for a distributed antenna system.

A system determines indoor positioning. The system includes design, implementation, monitoring of channel parameters, and testing tools for indoor and outdoor distributed antenna system (DAS) infrastructure. The system provides mobile network operators with a near-instant method of positioning, defining subscribers' location and track their movement as needed or desired.

The value of the system includes:
1. Commercial: such as targeted advertisement, indoor navigation and guidance service.
2. Public safety and the E-911 mandate of locating 911 service callers for example in high rise buildings.
3. Lawful indoor tracking of criminals by law enforcement agencies.
4. Mobile network optimization: as a result of the knowledge of the location of the handset, a network operator can determine a general location of certain network anomalies (such as service outages and call drops, low signal levels). With the aid of machine learning this is a vital part in self organized networks and automated optimization.
5. Indoor navigation of first responders.
6. Active and passive DAS performance monitoring and asset tracking.

The design concept and the hardware components to implement it aim at providing a DAS design and DAS implementation (e.g., installation) that enables the mobile network operator (also public safety E-911 public system answering point (PSAP) and law enforcement agencies) to identify the location of the subscriber using the standard network-based methods currently used for outdoor positioning. Using a method described in this patent, the system enables reproducible results with greater or higher accuracy in determining the location of the user than what is mandated by the E-911 requirements and state of the art proximity methods.

The design process produces a special DAS system design that delivers a unique and measurable RF channel characteristics and features for each logical location (a logical location is defined as a particular room, floor level, or other location), allowing the mobile network to identify the location of the user by comparing these measurements with a database of measurements and locations.

This database can be prepopulated with simulated values then calibrated or optimized using a calibration procedure and testing hardware.

Some details include: The design methods will result in a planned and studied modifications on the indoor radio frequency (RF) channel characteristics as opposed to a typical channel produced by the current industry approved design methods. The planned modification will result in having a unique RF channel characteristics for every logical location and elimination of ambiguities that cannot be resolved post implementation.

These unique channel characteristics are measured and reported to the mobile network by the mobile handset in regular intervals during its normal operation as defined by the communication standard, both in idle or active call states.

This allows the mobile network to identify the location of the mobile handset by comparing the measured values to a database of previously measured values in defined logical locations. Resulting in an accurate location determination.

The time needed to produce the location estimate is minimal since mobile measurement results are reported to the network at all times prior to making a call or data connection.

The RF channel characteristic is measured by the network under different names depending on the standard ultimately these values try to describe the channel impulse response in both time domain and power levels.

The method also utilizes the measurement of channel impulse response (CIR) in both uplink or downlink paths which are not necessarily the same specially with the active component delays in the middle. Uplink or upload link (UL) and downlink or download link (DL) gains and hardware delays are not always identical.

The method and hardware deal with the detailed channel impulse response if measurable by the network or any measurable values, or both, defined in the standard which may have a less resolution and accuracy. However, designed method described for the DAS is adaptable any measurement quantities.

Some examples of such measurement quantities that helps describe the physical channel impulse response, but not limited to, are:

1. Channel impulse response of both uplink and downlink
2. Power delay profile
3. Time of arrival
4. Delay spread
5. Round trip time
6. Received signal strength
7. Timing advance quantities in uplink and downlink
8. Observed time difference of arrival
9. Sounding reference signal
10. Any values define by the current or future standard that can be regarded as an abstract of a channel impulse response Since the modifications are done on the physical layer on the channel impulse response, this allows a reproducible positioning results given that all modification parameters are maintained.

A hardware channel controller is an integrated part of a DAS hardware, or as an add-on to the installed DAS infrastructure, to automate the introduction of designed changes required to implement the unique channel characteristics.

This channel controller acts on the DAS channel in both uplink and downlink communication channel as a group or uplink or downlink channel separately. Also if needed producing an asymmetrical channel delays in terms of uplink and downlink allowing for an additional degree of freedom and more features to look at in fingerprinting Special test tools can be used as a method to manually or automatically fine tune and calibrate the designed parameters. Also the same tools are used to generate and prepopulate the database with CIR measurements tagged with the accurate location. The database is then postprocessed to generate technology specific values for the lookup tables and database correlation.

The process of looking up a fingerprint in a database is normally referred to as database correlation method. In the described method of design, the resulting database features to be monitored is a small subset of the typically used in the low performance in use.

In other words, eliminating the ambiguity and providing a one-to-one mapping of the small set of monitored features of the channel against a logical location.

Distributed antenna systems. Some details of distributed antenna systems are in a dissertation (e.g., chapter 2) by the inventor: Ahmed Sallam Mohamed Ibrahim, A Study of DAS delays and their Impact on the Wireless Channels with Application to Indoor Localization (2015) (published M.S. thesis, Rochester Institute of Technology), available at http://scholarworks.rit.edu/theses/8872/. This document is incorporated by reference.

Design method for power. It is important to understand the current design method and improved methods that incorporate hardware parts. Current method of indoor design will target signal level availability. Design for coverage, in other words, can be formalized in the flow graph below.

Figure 1B:
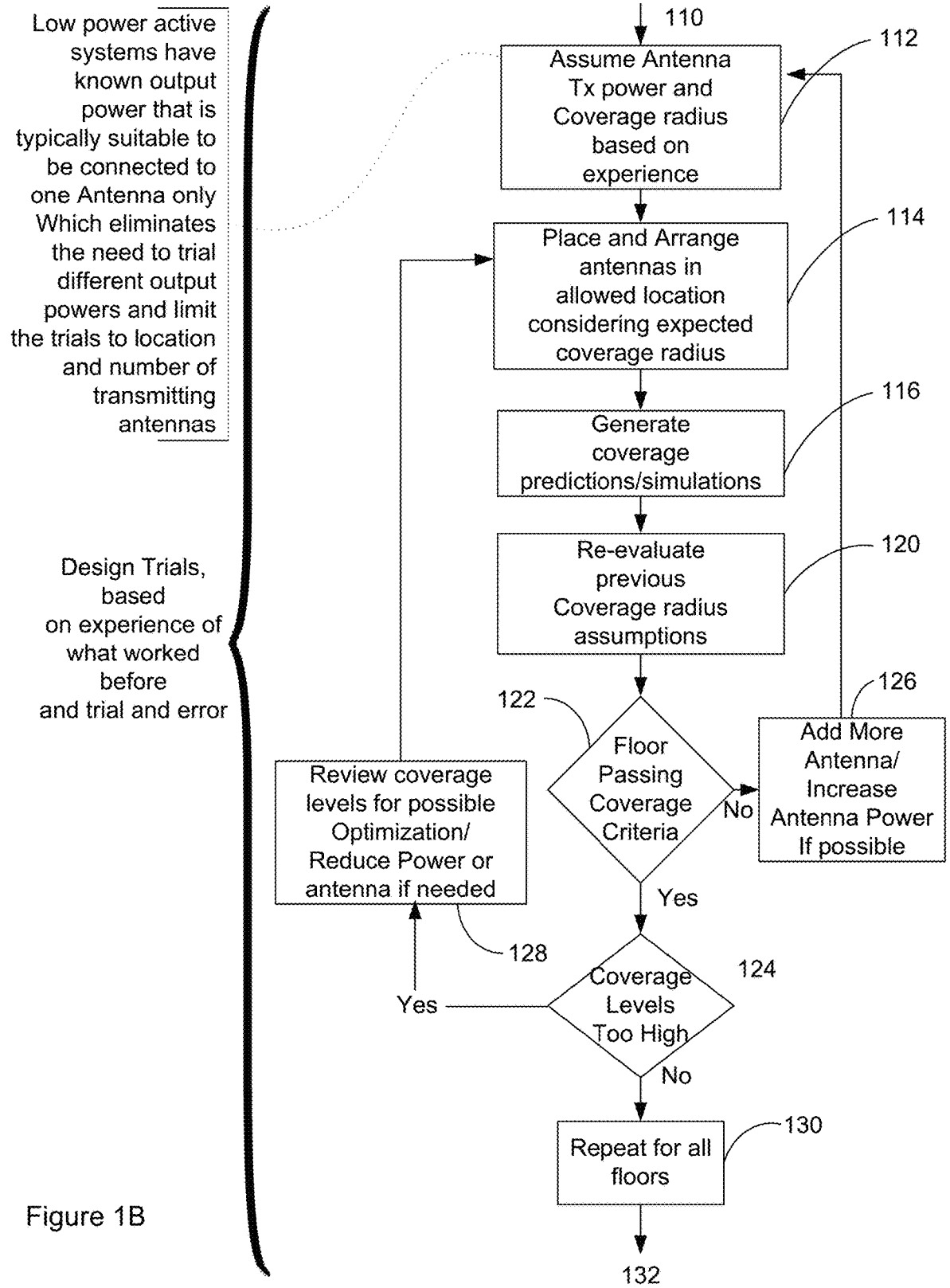
Figure 1C:
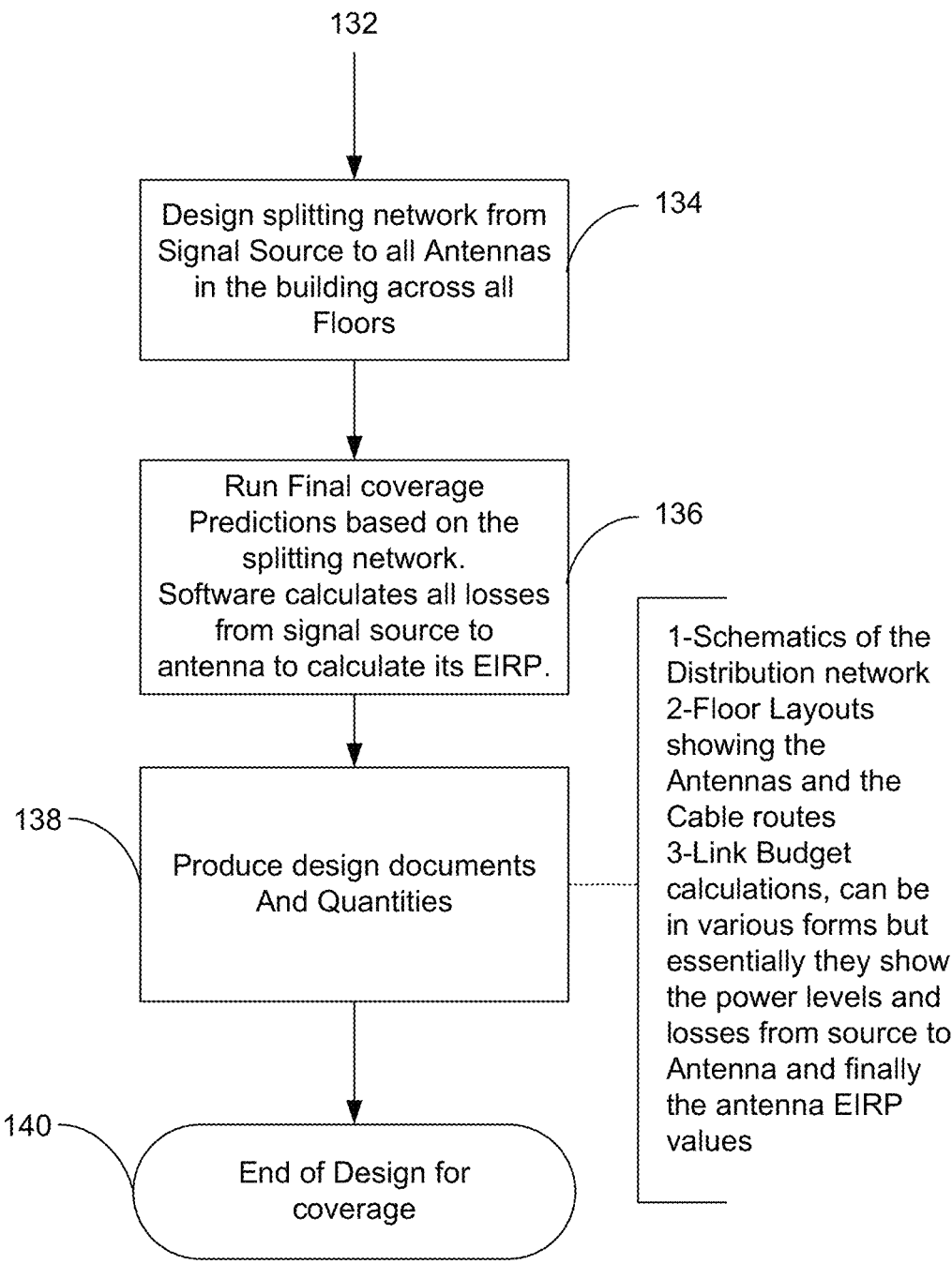

FIGS. 1A-1C show a design process for a distributed antenna system. A flow 102 is for DAS design for coverage using software tools. This flow relates to passive DAS design, but can apply also to high power and medium power active design. Using a constant antenna power for all antennas for the purpose of coverage, simulations, and trials. Once antenna power and location are satisfactory to the user, the user then moves to the passive splitting network design to deliver the required signal power from the signal source to the antenna locations. This involves the use of power splitters and coaxial cables of various diameters and losses.

In a step 104, import floors and layouts. In a step 106, define layout dimensions and floor order and distance between floors. In a step 108, define walls and their types. Steps 104-108 relates to a three-dimensional building model.

A line 110 connects step 108 of FIG. 1A to a step 112 of FIG. 1B. In step 112, assume antenna transmission (Tx) power and coverage radius based on experience. In a step 114, place and arrange antennas in allowed location considering expected coverage radius. In a step 116, generate coverage predictions or simulations. In a step 120, reevaluate previous coverage radius assumptions.

In a step 122, determine if floor passing coverage criteria. If yes, proceed to step 124. If no for step 122, proceed to step 126. In step 126, add more antenna or increase antenna power if possible. Then, return to step 112.

In step 124, determine if coverage levels too high. If yes for step 124, proceed to step 128. In step 128, review coverage levels for possible optimization or reduce power or antenna if needed. Then return to step 114.

If no for step 124, proceed to step 130. In step 130, repeat for all floors. For steps 112 to 130, low power active systems have known output power that is typically suitable to be connected to one antenna only. This eliminates the need to try different output powers and limit the trials to location and number of transmitting antennas. Design trials can be based on experience of what has worked before as well as trial and error.

A line 132 connects step 130 of FIG. 1B to a step 134 of FIG. 1C. In step 134, design splitting network from signal source to all antennas in the building across all floors. In a step 136, run final coverage predictions based on the splitting network software calculates all losses from signal source to antenna to calculate its EIRP. In a step 138, produce design documents and quantities. This can include: (i) schematics of the distribution network, (ii) floor layouts showing the antennas and the cable routes, and (iii) link budget calculations, can be in various forms but essentially they show the power levels and losses from source to antenna and finally the antenna EIRP values.

In a step 140, this is an end of the design flow for coverage.

Design process and method for LocationDAS. An approach to design indoor sites is to design for location services in mind. The outcome of this design is an infrastructure that enables standard outdoor location methods to be used indoors. Moreover, recommendation of new set of measurement to be monitored to determine location in addition to the standard values. The general process of DAS design for a location can be thought of as in FIGS. 2A-2B.

The final result of the design will be optimized and emulated and checked in the software tools against different telecommunication standards detection methods. These telecom standards will have a different set of measurement values to be monitored with certain resolutions. The worst case scenario is normally linked to the method of lowest resolution.

The design can be optimized to a certain detection method relaxing the modification required by other lower resolution methods.

For all methods described in this section a physical modification on the channel is required and can be achieved by the design methods and tools described below.

Figure 2A:
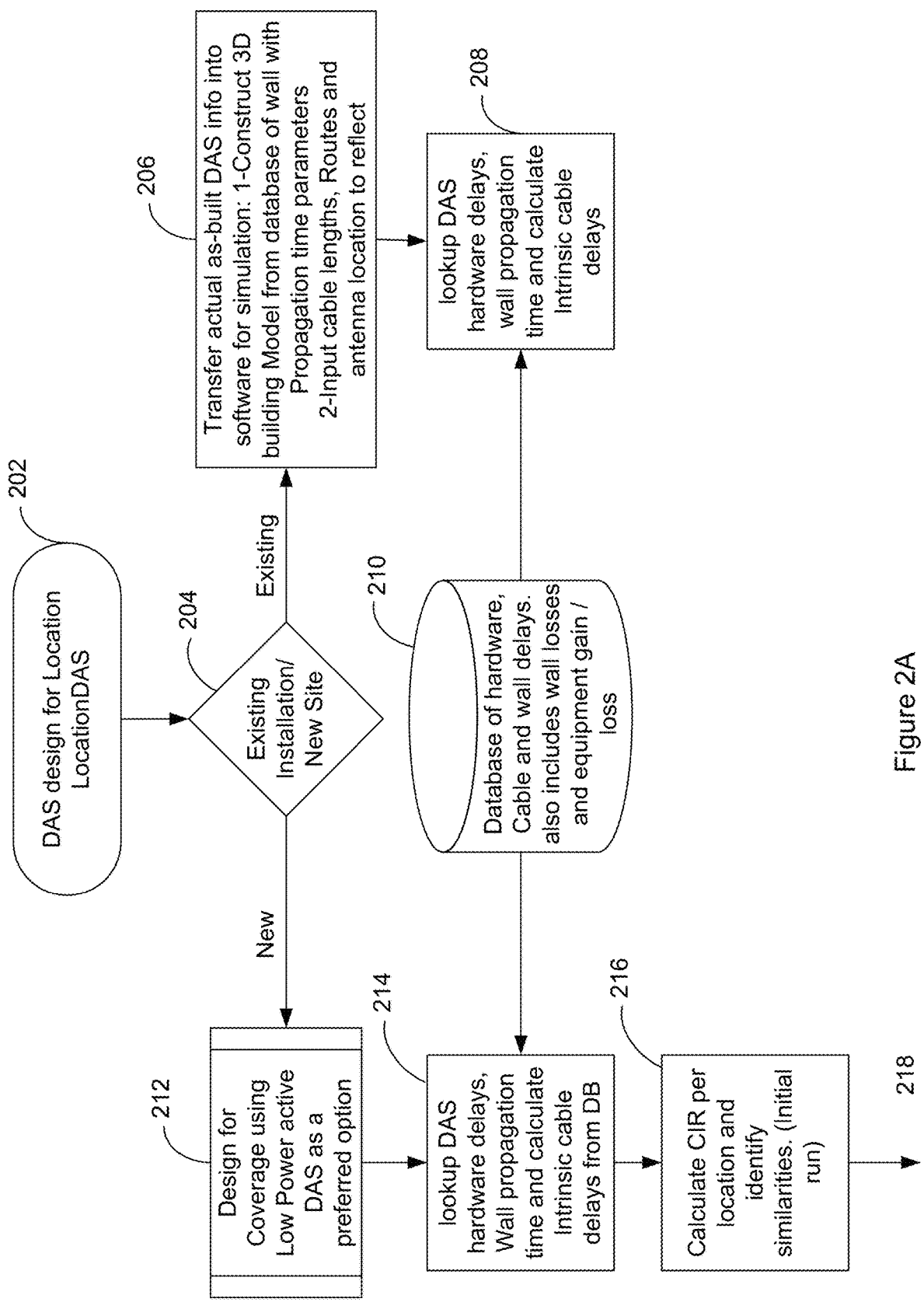
FIGS. 2A-2B show a design process for indoor positioning for a distributed antenna system.
Figure 2B:
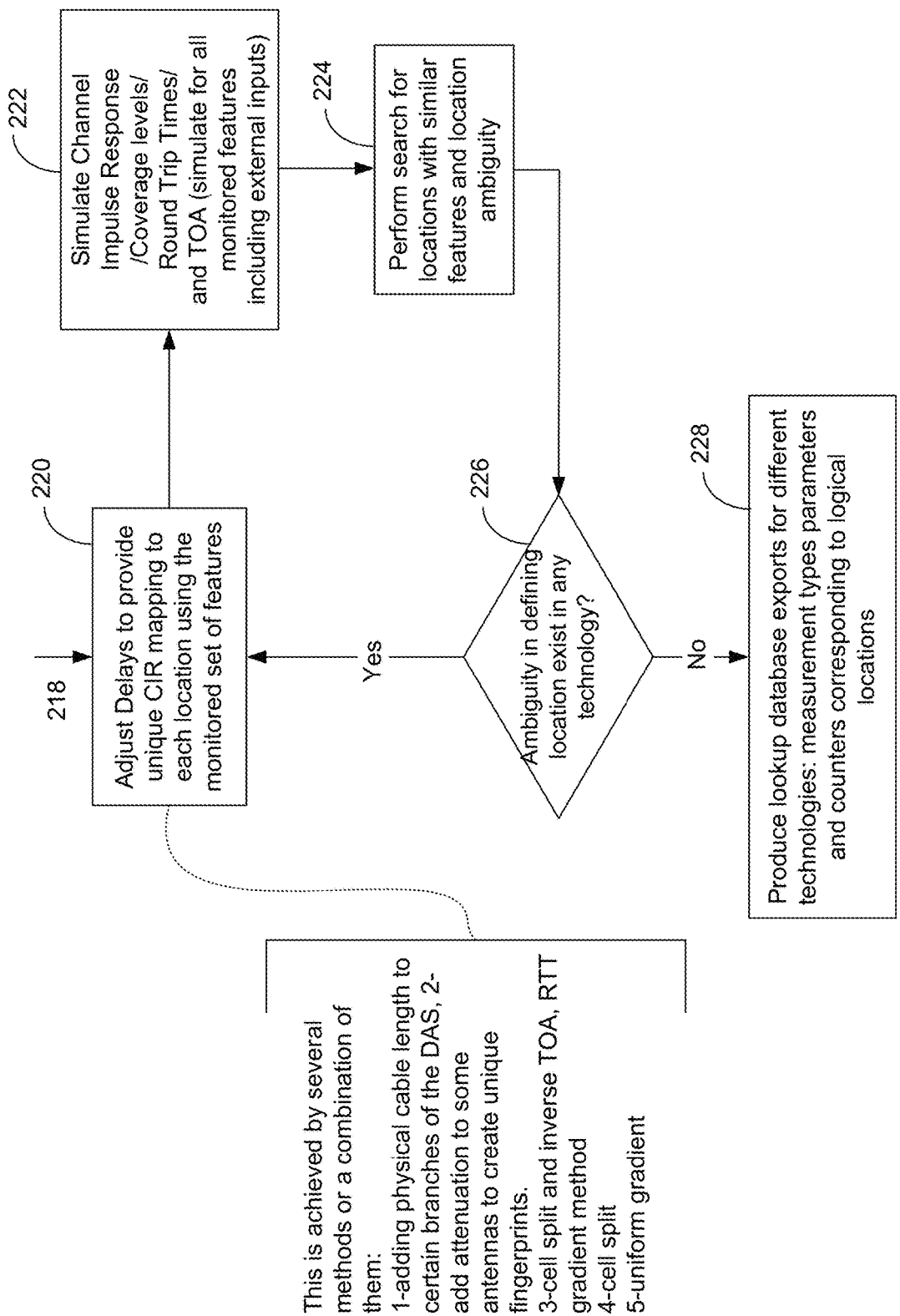

FIGS. 2A-2B show a design process for indoor positioning for a distributed antenna system. A flow 202 if for DAS design for a system (e.g., can be referred to as a Location-DAS system). In a step 204, determine if existing Installation or new site. If existing, proceed to a step 206. In step 206, transfer actual as-built DAS info into software for simulation. This can include (i) construct three-dimensional building model from database of wall with propagation time parameters and (ii) input cable lengths, routes, and antenna location to reflect.

In a step 208, lookup DAS hardware delays, wall propagation, time, and calculate intrinsic cable delays from a database 210. Database 210 is a database of hardware, cable, and wall delays. The database also includes wall losses and equipment gain and loss.

In new for step 204, proceed to a step 212. In step 212, design for coverage using low power active DAS as a preferred option. In a step, 214; lookup DAS hardware delays, wall propagation time, and calculate intrinsic cable delays from database 210. In a step 216, calculate CIR per location and identify similarities. This can be an initial run.

A line 218 connects step 216 of FIG. 2A to a step 220 of FIG. 2B. In step 220, adjust delays to provide unique CIR mapping to each location using the monitored set of features. This can be achieved by one of several methods, or a combination of them: (i) adding physical cable length to certain branches of the DAS, (ii) add attenuation to some antennas to create unique fingerprints, (iii) cell split and inverse TOA, RTT gradient method, (iv) cell split, or (v) uniform gradient.

In a step 222, simulate channel impulse response or CIR or coverage levels or round trip times, or time of arrival or TOA, or any combination. This can be a simulation for all monitored features including external inputs. In a step 224, perform search for locations with similar features and location ambiguity.

In a step 226, determine if ambiguity in defining location exist in any technology. If yes, return to step 220. In no, proceed to step 228. In step 228, produce lookup database exports for different technologies. This can include measurement type parameters and counters corresponding to logical locations.

Methods for designing a LocationDAS System. A list of methods and tools to achieve a location aware and optimized DAS is listed below. One particular LocationDAS system can utilize a single method or a combination of them Uniform travel time gradient method. One method of designing indoor sites for location is to achieve an increasing and uniform travel time (or time of arrival measurement) gradient across the three dimensions of the coverage area and building. This can be achieved by controlling transmit delay to have the required gradient. One method to achieve this physically, but not limited to that, is by avoiding parallel branching of coaxial cables and maintaining a single path of power transport per RF sector. This will result in a uniformly increased transmit time of the transmitting elements.

Time stretching for clear detection window per antenna. As an incremental improvement on this method, a stretching of time scale is to have higher transmit time differences between the transmit antennas. Such time stretching will result in a higher gradient which translates to higher accuracy of location detection.

Some details include: This will help achieving clear detection window of the monitored set of attributes. By stretching time domain of the CIR components, this will produce a higher guard band in the measurements. This is more suitable to the lower resolution measurement methods. In essence, the dominant CIR component will have a clear time window of detection linking it to a specific antenna and location.

Figure 3:
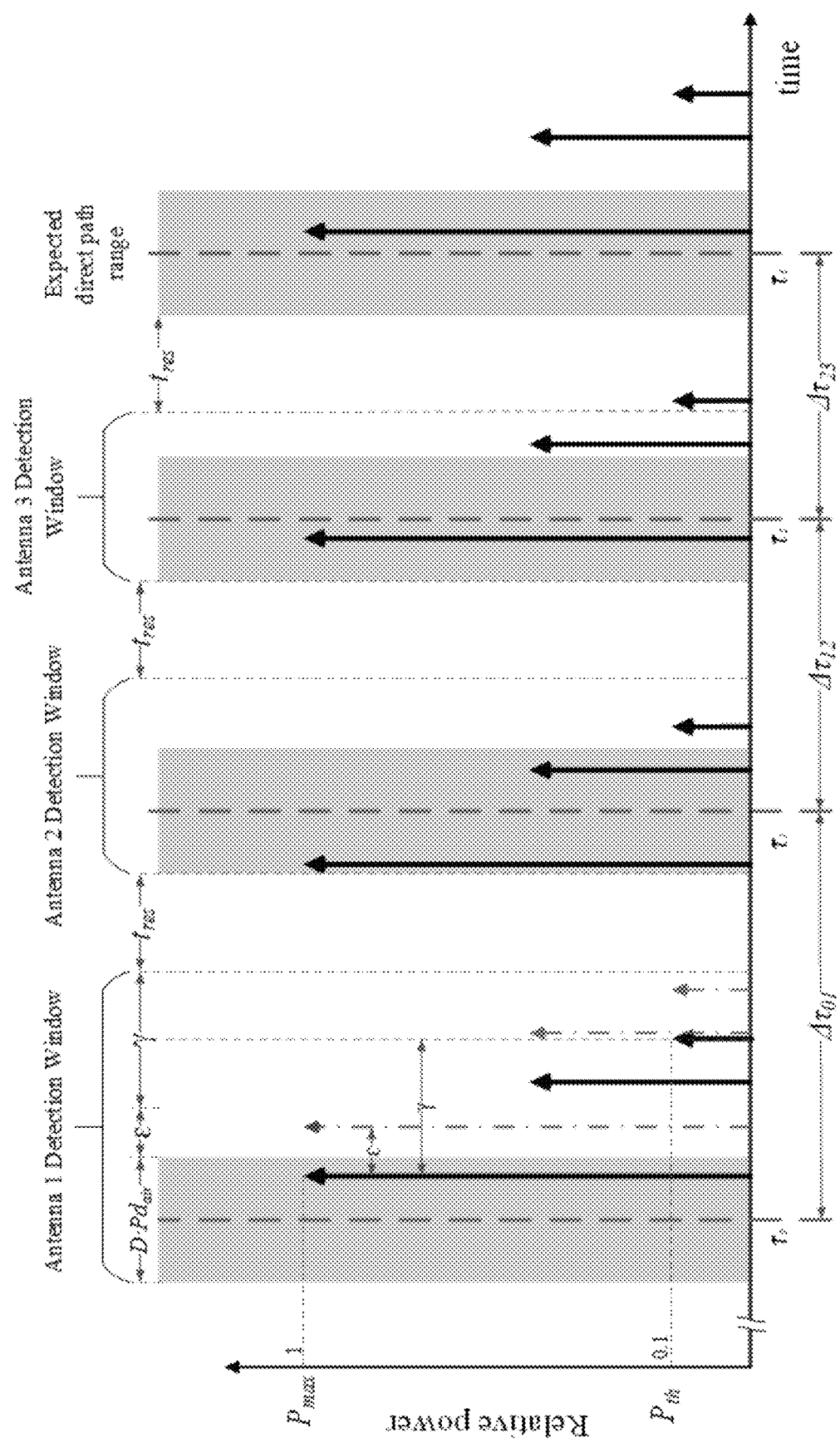
FIG. 3 shows a timing diagram of various detection windows per antenna with various delays and relative power.

FIG. 3 shows a timing diagram of various detection windows per antenna with various delays and relative power. The diagram or graph shows relative power versus time for antenna detection windows including an antenna 1 detection window, antenna 2 detection window, antenna 3 detection window, and expected direct path range.

There is a difference or delta in time (dt01) between the antenna 1 and 2 detection windows. There is a difference in time (dt12) between the antenna 2 and 3 detection windows. There is a difference in time (dt23) between the antenna 2 detection window and the expected direct path range.

Time stretching with channel modification to produce unique CIR and power PDP. Additional to the time stretching method described above, modification of antenna transmission power, transmit timing, and gains to differentiate CIR for locations with multiple path components. This method will require monitoring of CIR and some power measurements to be added to the monitored set of measurements and their derivatives including but not limited to: delay spread, received signal power, signal to noise ratio. Below is an example of different designed CIR or power delay profile (PDP) for different physical locations.

Figure 4:
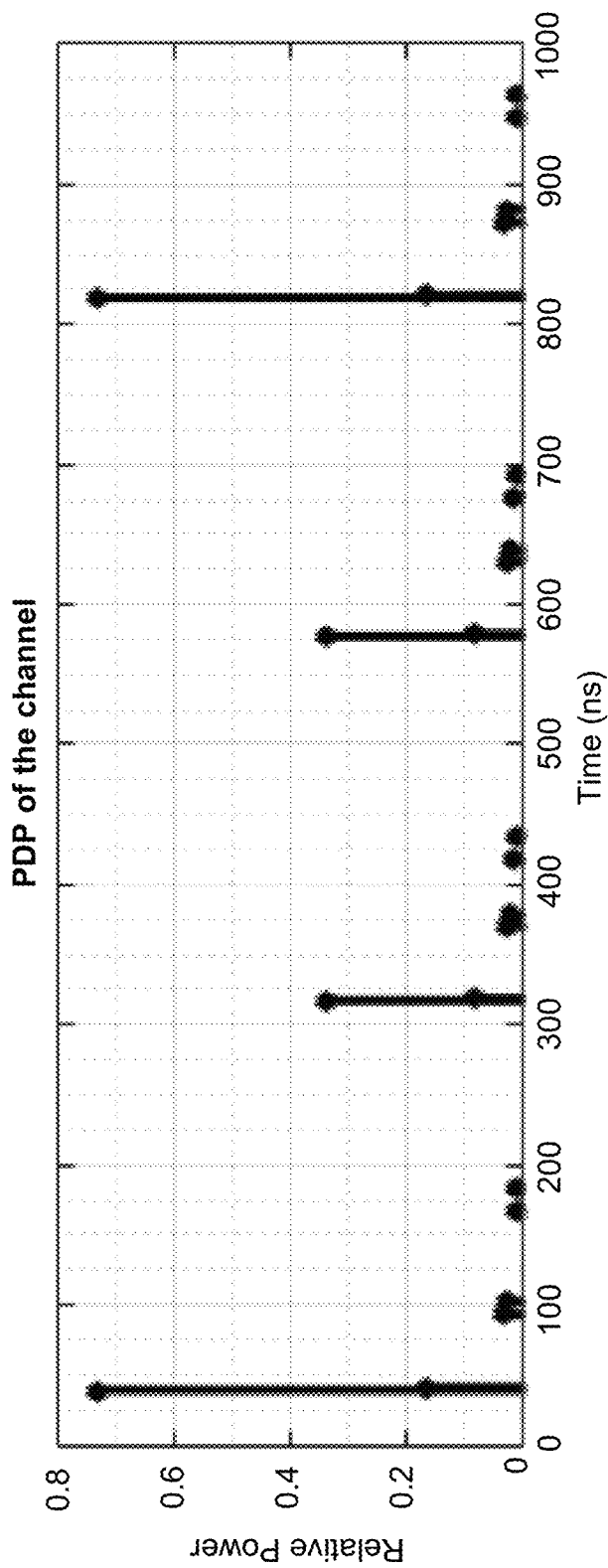
FIG. 4 shows an example of a power delay profile.

FIG. 4 shows an example of a power delay profile. The diagram or graph shows relative power versus time in nanoseconds, from 0 to 1000 nanoseconds.

Figure 5:
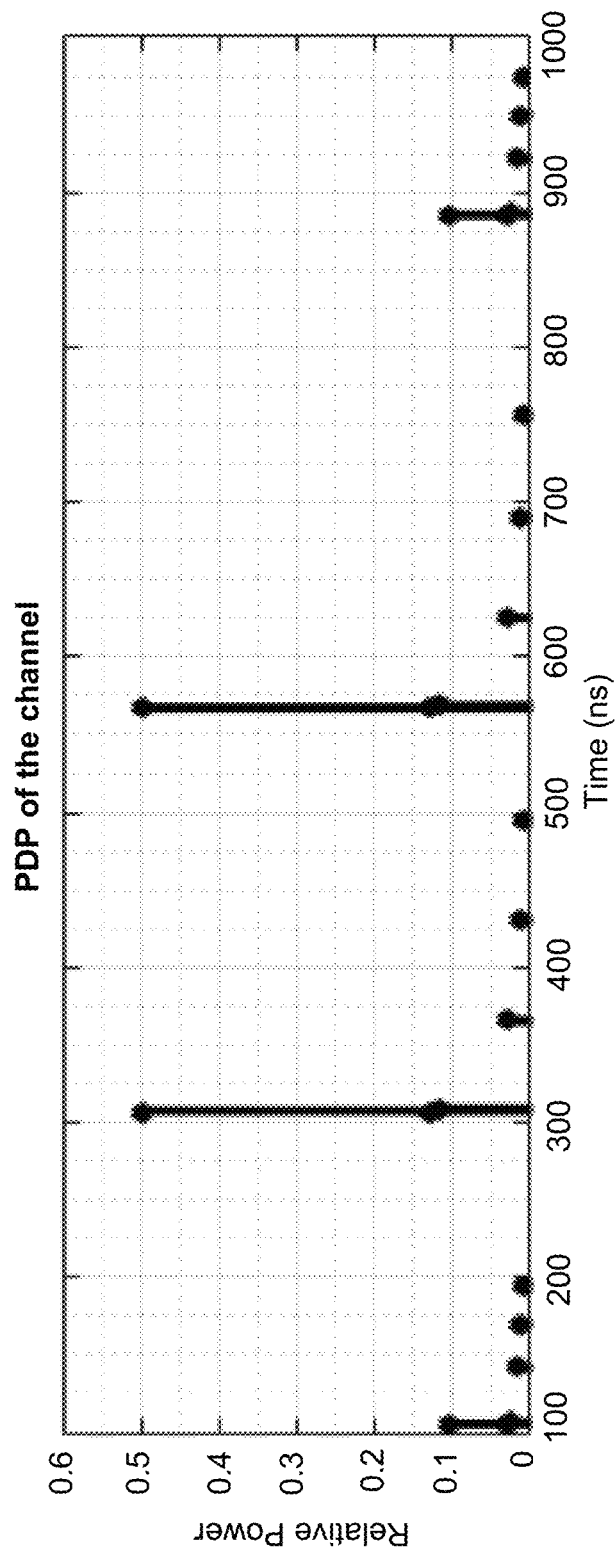
FIG. 5 shows another example of a power delay profile.

FIG. 5 shows another example of a power delay profile.

Inverse travel time gradients method. As described above, one method of designing indoor sites for location is to achieve an increasing and uniform travel time (time of arrival) gradient across the area of coverage. A significant improvement on this method is to utilize two or more different indoor RF sectors to produce a well defined time difference of arrival measurement. The time difference of arrival both in uplink or downlink will have a very unique feature where slope is doubled for the governing relation of location and time difference of arrival readings.

Standard method of design will produce an almost constant travel time difference between different sectors indoor.

Modifying the physical connectivity routes will create an increasing and decreasing Travel time (time of arrival) of two sectors with respect to the receiver's position. As one increase with a certain rate. The second is decreasing with a similar rate. And hence the difference is double the rate with respect to position.

Using a DAS channel controller there is no need to change the route of cabling and hence solve a real installation and implementation problem.

Figures 6A, 6B:
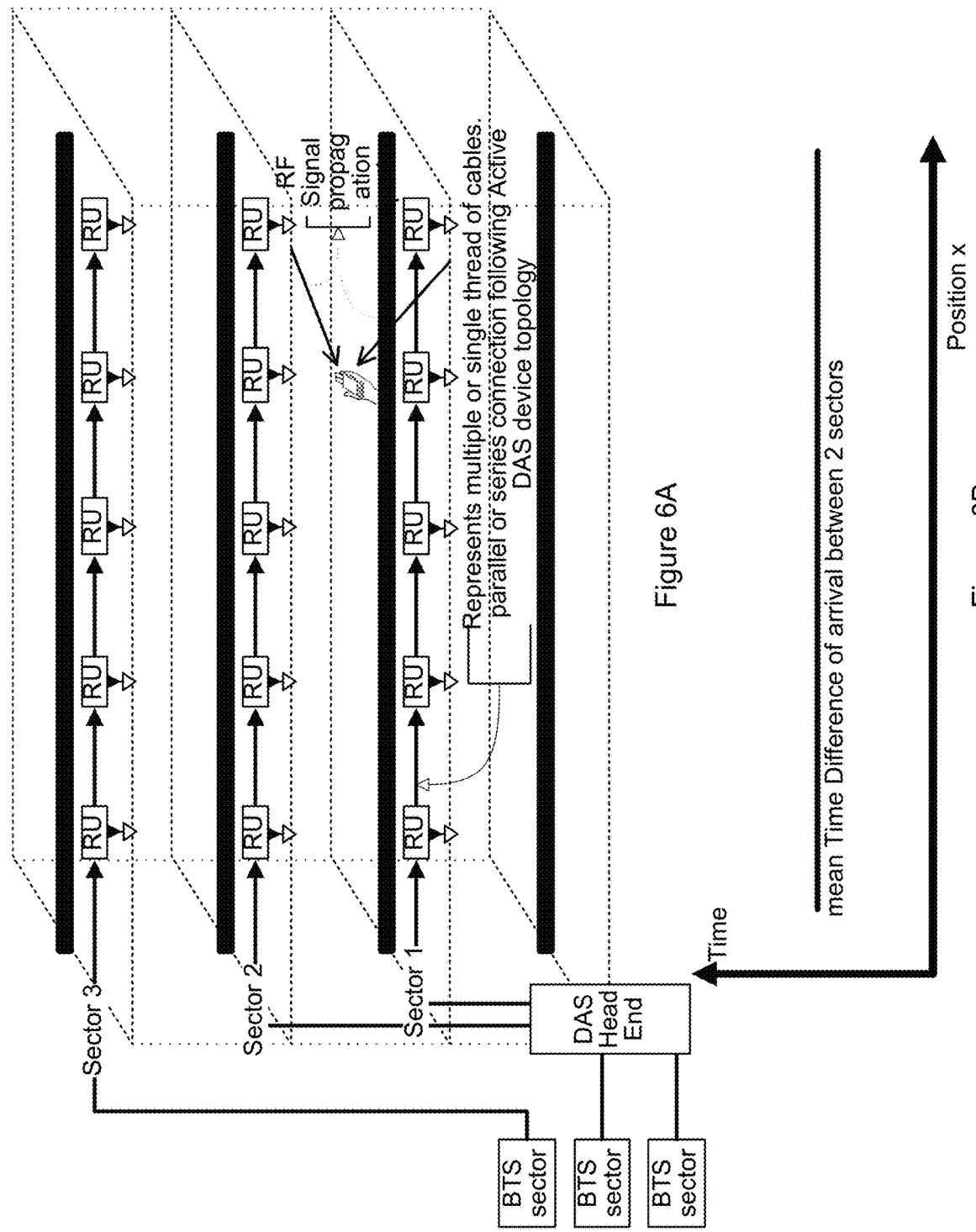
FIGS. 6A-6B show a method of design that will produce an almost constant travel time difference between different sectors indoor.

FIGS. 6A-6B show a method of design will produce an almost constant travel time difference between different sectors indoor. FIG. 6A shows an organization or positioning of receiving units (RUs) and antennas within a structure, such as a multistory building. For example, there are three sectors, which can represent three different floors. FIG. 6B shows diagram of timing versus position, indicating a mean time difference of arrival between two sectors.

Figures 7A, 7B:
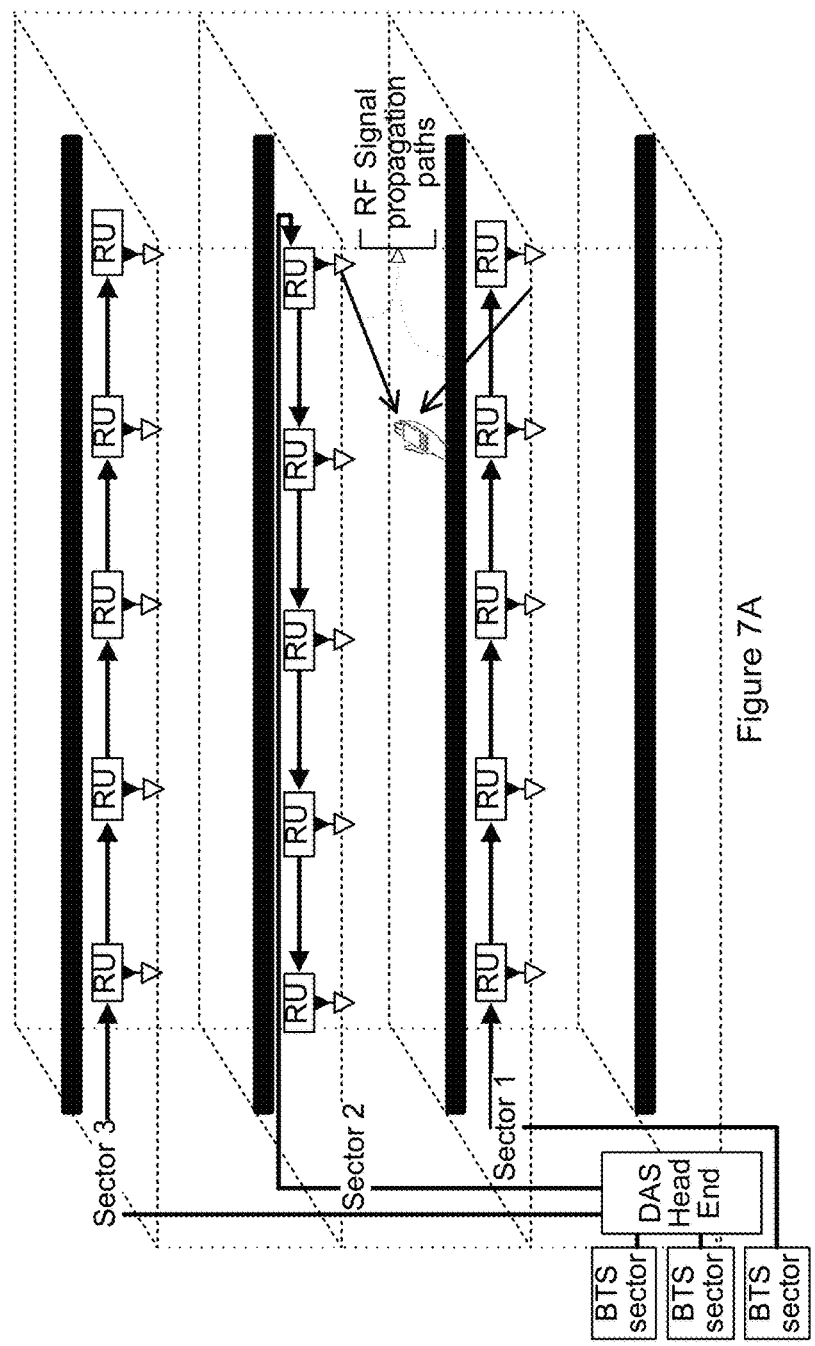
FIGS. 7A-7B show a method of design where modifying the physical connectivity routes will create an increasing and decreasing time of arrival of two sectors with respect to position.

FIGS. 7A-7B show a method of design where modifying the physical connectivity routes will create an increasing and decreasing time of arrival of two sectors with respect to position. FIG. 7A shows an organization or positioning of receiving units and antennas within a structure, such as a multistory building. For example, there are three sectors, which can represent three different floors.

FIG. 7B shows diagram of timing versus position, indicating a mean time difference of arrival between two sectors. As one increase with a certain rate. The second is decreasing with a similar rate. And hence the difference is double the rate with respect to position.

Inverting spiral method. This method can be thought of as a special case of the inverse time gradient method except this one uses a single RF sector. In essence this means this method will use a different set of measurement to monitor the location. Namely the travel time or its variants (e.g. time of arrival, round trip time, and others) in addition to monitoring the CIR or its variants (e.g., power delay profile, delay spread, and others)

The connection of transmitting antenna will follow an alternating direction in consecutive floors. A first floor will have the connection following a clock wise direction and a counter clock wise direction on the following floor. Utilizing this method each location can be identified by a unique set of channel impulse response and travel time of first multipath component. That can be measured in its simplest form by a unique round trip time and delay spread values.

Figure 8:
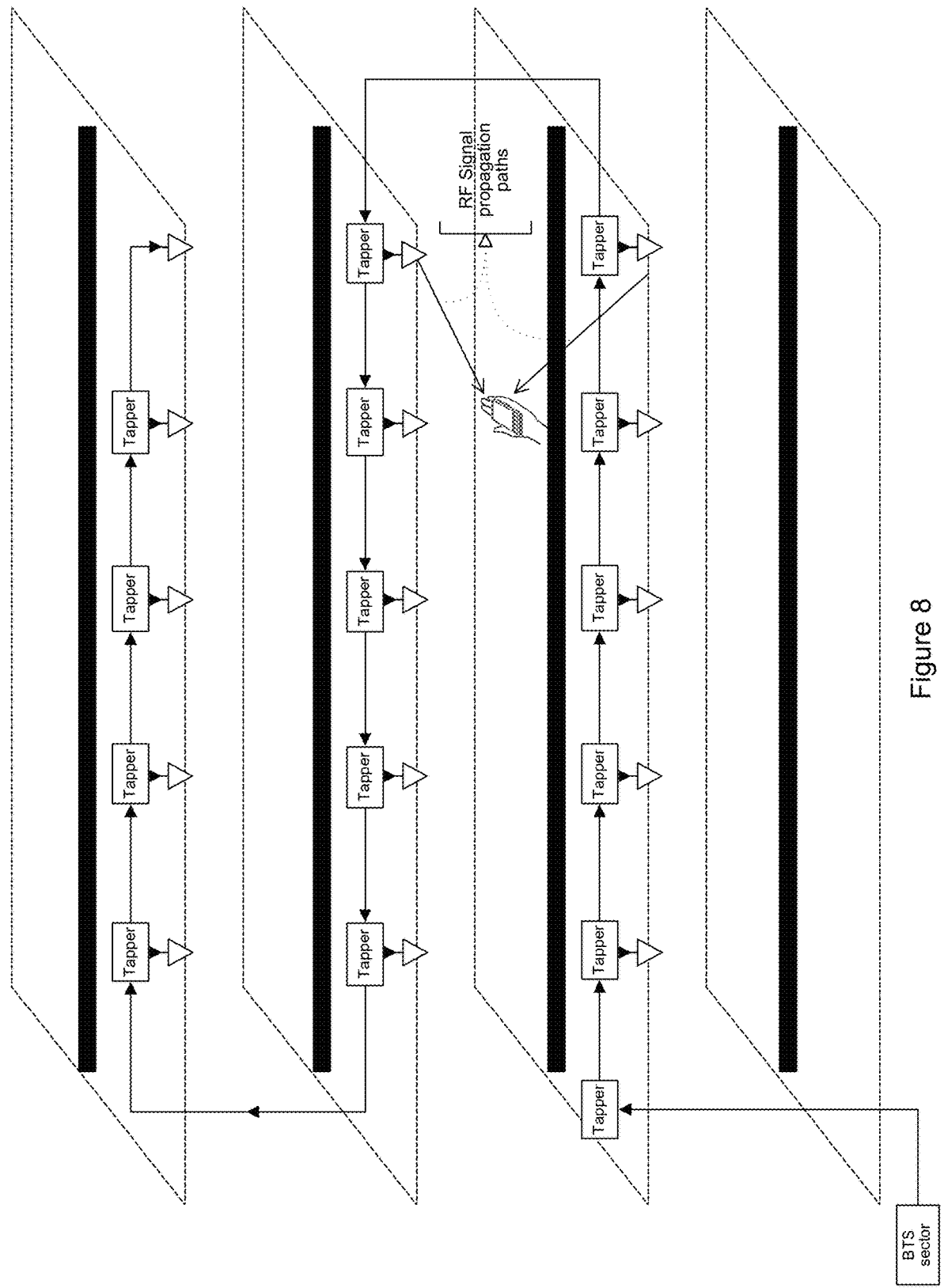
FIG. 8 shows a distributed antenna system connection using an inverting spiral method.

FIG. 8 shows a distributed antenna system connection using an inverting spiral method, assuming antennas are simplified and aligned in one direction. However, the general case can be of any arrangement in any direction across the floor.

Combining indoor and outdoor time readings of travel time (e.g., time of arrival) and other ranging methods to construct imaginary dimensions and reference lookup table. Assuming a site is well configured to have an increased gradient of time of arrival (TOA) across the coverage area. The time difference of arrival (TDOA) and all their variants measurements can be translated into a look up location adding an additional feature to look for.

Since the indoor delay is not linearly related to the distance from base transceiver station (BTS) (which is located inside a room). The standard method of time difference of arrival will produce erroneous results. A look-up table is designed and extracted from the modified indoor design to produce the correct time difference of arrival to location translation.

Location service system architecture. Several components contribute to a complete indoor positioning method. A simplified process and system components is described in Ahmed Sallam Mohamed Ibrahim, A Study of DAS delays and their Impact on the Wireless Channels with Application to Indoor Localization (2015) (published M.S. thesis, Rochester Institute of Technology), available at http://scholarworks.rit.edu/theses/8872/. This document is incorporated by reference.

The described methods and addition to the existing mobile network components are realized in both hardware and software components.

Software tools components represent, simulate, and predict the results of physical channel modifications to be carried out.

Channel changes are implemented through physical modification at the implementation phase. These modifications deviate from the standard approach of design and implementation of a distributed antenna system.

Additional hardware component are introduced that reduces the required physical modification and automate channel manipulation.

Figure 9A:
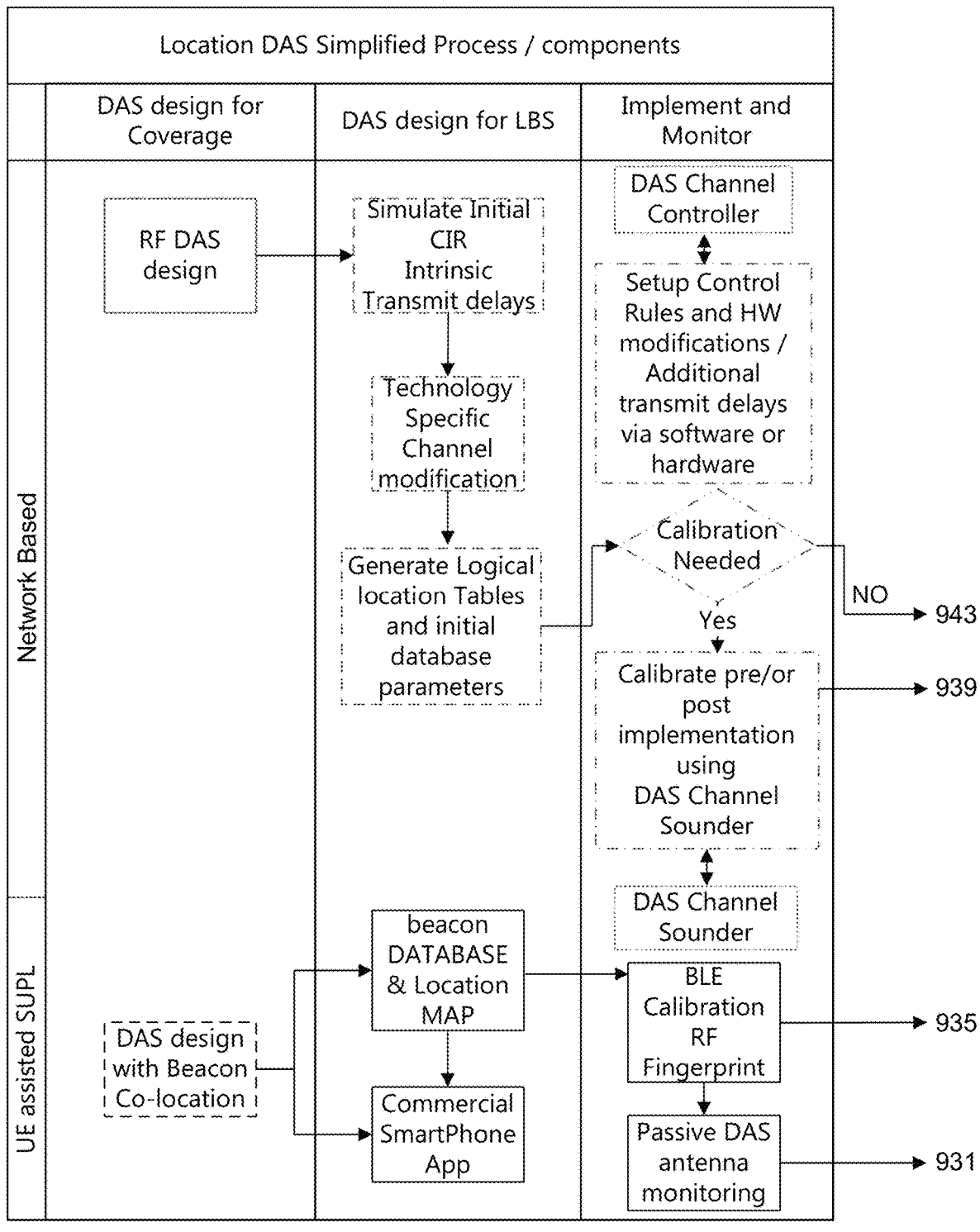
FIGS. 9A-9B show a simplified process and components for a distributed antenna system.
Figure 9B:
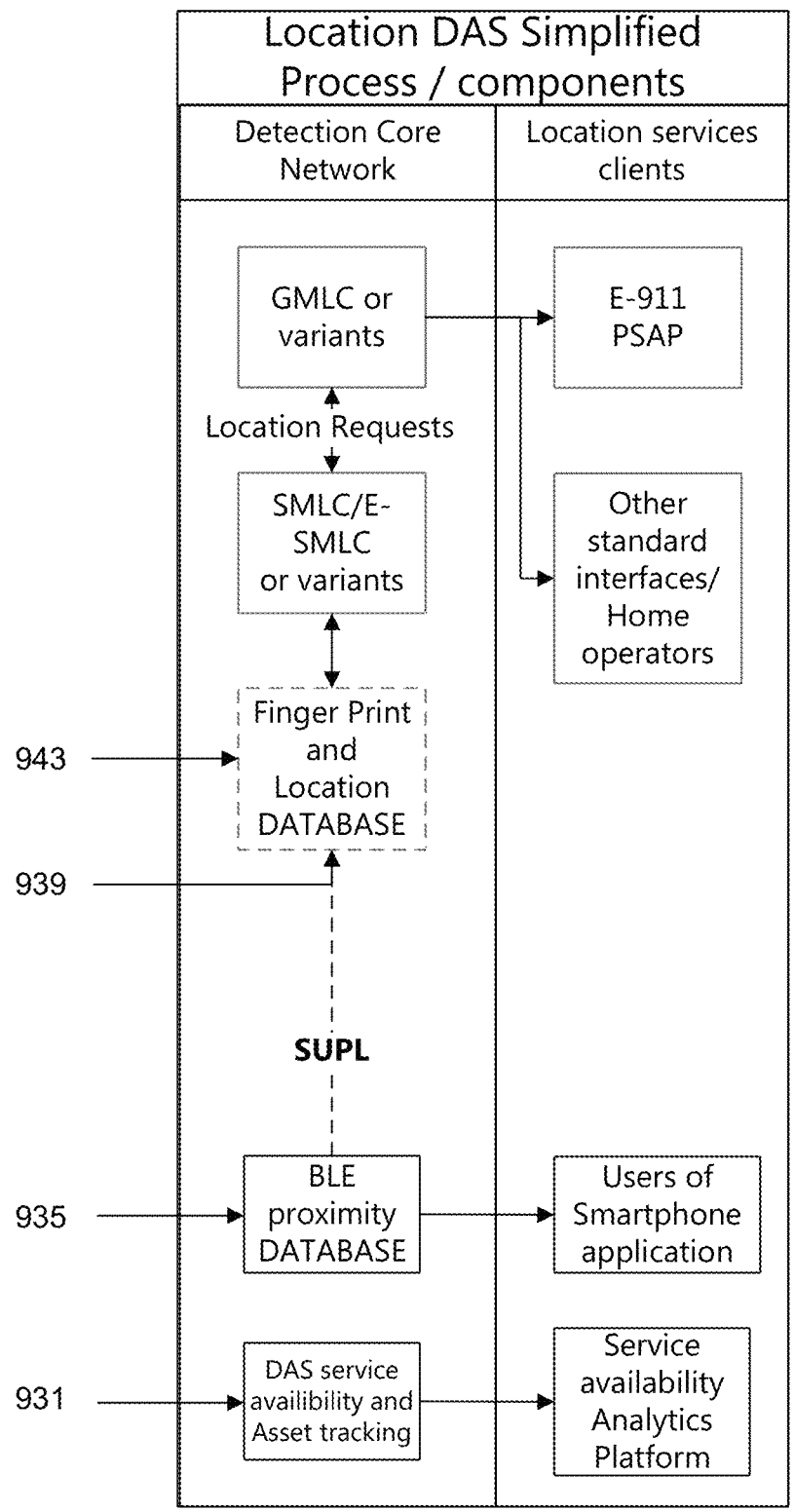

A special set of test equipment and tools are used to measure and calibrate the channel in real life. Also to provide continuous monitoring and update of location database and servers FIGS. 9A-9B show a simplified process and components for a distributed antenna system. Line 931, 935, 939, and 943 connect blocks in FIG. 9A to blocks in FIG. 9B.

Some of the blocks are software. These blocks include DAS design with beacon co-location, simulate initial CIR intrinsic transmit delays, technology specific channel modification, generate logical location tables and initial database parameters, and fingerprint and location database.

Some of the blocks are software and hardware. These include setup control rules and hardware modification and additional transmit delays via software or hardware, and calibrate pre or post implementation using DAS channel sounder.

Some of the blocks are hardware. These includes DAS channel controller and DAS channel sounder.

Physical channel modification methods and devices to control the CIR. Implementation of all methods described earlier on the infrastructure will require addition of calculated delays to the physical path of the signal either via digital delay or physical delay hardware. In addition to delays, modification of power output (e.g., amplitude of a signal) and gain settings is also a tool to be used.

Advantages and disadvantages of digital and physical delays and the role of the new channel controller for post installation modifications. Physical delay: Controlling the channel impulse response of a DAS system via introducing physical delay proves to be the most stable method of delay introduction into the system. However, trying to realize this using extra length of fiber and coaxial cables runs proves to be very hard to achieve from installation perspective. Also prone to uncontrolled modification by unaware users of the system (e.g., port changes and connection swaps).

Spooling physical cables to add more delay will require additional area and volume in installation.

The need for a device to control the channel impulse response for each location without any additional cable installation is crucial and a key success factor of the concept.

Digital delay: While controlling the delay using electronic delay lines or digital delays appears to be a straight forward method (e.g., using filters a digital signal processor (DSP) or a field programmable gate array (FPGA) circuit), the digital delay step proves to be large compared to desired resolution. To have a fine control over the channel impulse response a step of as low as, for example, 10 nanoseconds might require a very high sampling speed for the digitization of the signal. Fine adjustment and control over digital delay adds another complexity to the control system. Synchronization circuitry is also a source of complexity over the physical delays methods.

A digital system introduces a fixed digitization delay that might be beyond what is allowed by some technologies over the air interface.

Introducing the CIR modifications using a digital system is possible but going to increase such delays and render the DAS system incompatible with the some technologies. A controllable physical delay is the most suitable method for all technologies.

DAS channel controller hub includes:

1. Physical channel controller as an add-on or integrated into DAS equipment over any transmission medium such as optical fiber and copper.

2. Allows the designer to insert, sort and arrange additional fiber length beyond the minimum required cable length to connect two active DAS elements.

3. DAS channel modifications such as delays can be introduced in downlink (forward) or uplink (reverse) paths independently allowing the designer to control the uplink and downlink channel impulse response independently.

4. Independent changes on uplink and downlink paths add additional degree of freedom when crafting a special CIR and location detection techniques to eliminate location ambiguity. This addition can be made on the downlink only keeping uplink intact or vise versa.

5. Main use case of the channel controller is to create a unique CIR in either uplink or downlink. Minimizing a multipath effect is not the target of this delay as used in previous approaches. Specifically, it is important to mention that "minimizing multipath components" and delay is not a target of this DAS channel controller and not considered a desired outcome, on the contrary to previous methods where introduction of delays was done solely to minimize multipath at a certain reception point. The methods described maintain multipath and controls it in a unique manner to allow identification of user equipment location.

6. This DAS channel controller eliminates the need to spool cables externally or add additional cable lengths other than the needed for installation purpose. This applies for all methods described in this document 7. The device has a processing and communication units to perform needed calculations with the aid of other system components in DAS hardware, testing tools and system servers 8. The device performs the following task in addition to its main task: Measure, calibrate monitor, and control the CIR in terms of its different component timing and amplitude in both the downlink and uplink directions associated with a certain location coordinate in a predefined indoor coordinate system.

9. Measure and perform calculations of user equipment processing retransmission time.

Figure 10:
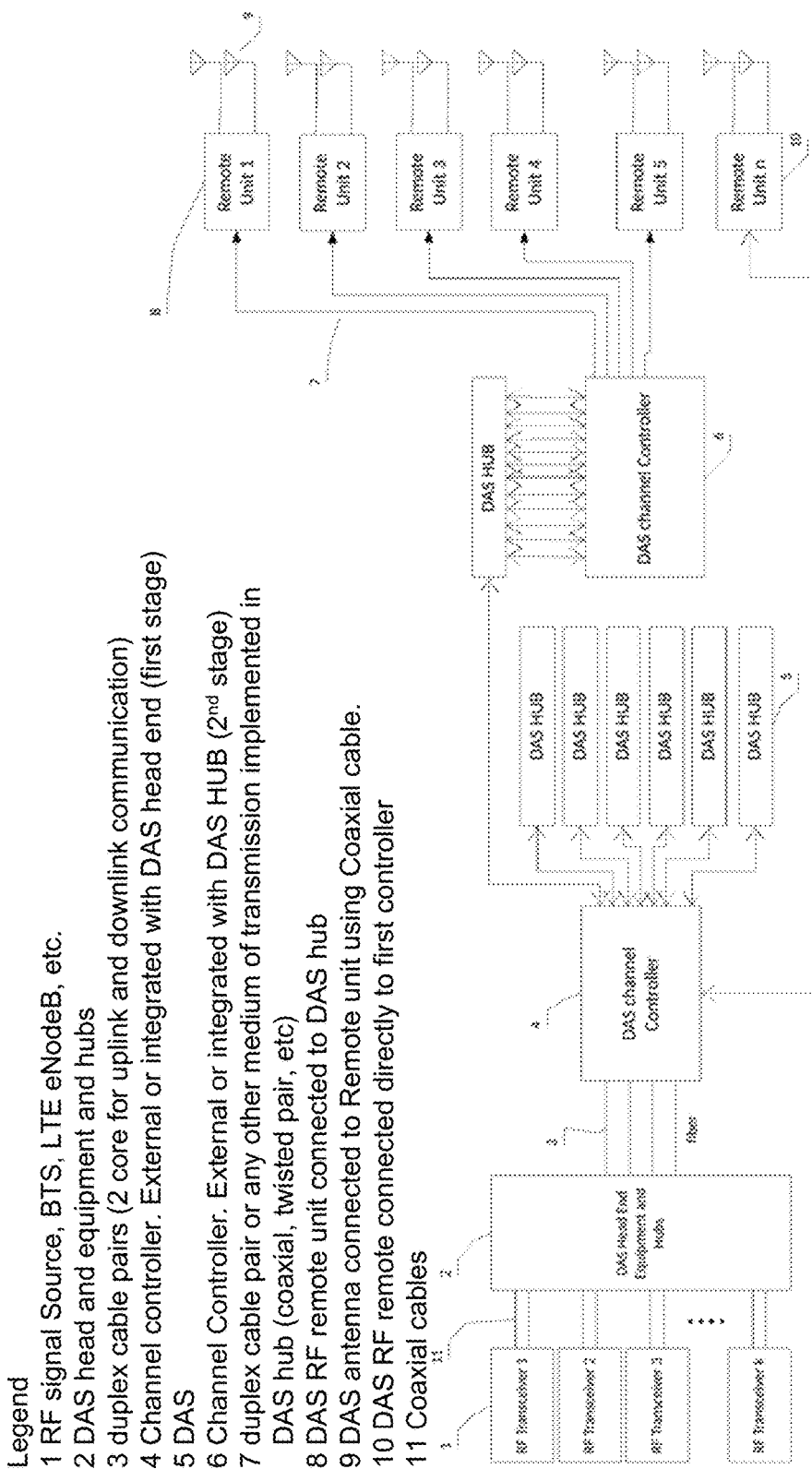
FIG. 10 shows distributed antenna system channel controller inline with active distributed antenna system components.

FIG. 10 shows distributed antenna system channel controller inline with active distributed antenna system components. Some functions of the DAS delay controller can include: Periodically or continuously monitor the predefined das cable lengths. Maintain the predefined settings against uncontrolled changes such as cable changes and cable swaps. Alarm and notification of changes on connected cable lengths. Cable types can be fiber or coaxial cable.

Components for FIG. 10 include:

1. RF signal Source, BTS, LTE eNodeB, and others.
2. DAS head and equipment and hubs.
3. Duplex cable pairs (two core for uplink and downlink communication).
4. Channel controller. External or integrated with DAS head end (first stage).
5. DAS.
6. Channel Controller. External or integrated with DAS HUB (second stage).
7. Duplex cable pair or any other medium of transmission implemented in DAS hub (coaxial, twisted pair, or others).
8. DAS RF remote unit connected to DAS hub.
9. DAS antenna connected to remote unit using coaxial cable.
10. DAS RF remote connected directly to first controller.
11. Coaxial cables.

In FIG. 10, a number of RF transceivers is connected via cables to the DAS head end equipment and hubs. The DAS head end is connected via fiber to the DAS channel controller. The DAS channel controller is connected to a number of DAS hubs. A DAS hub is connected to another DAS controller, which is connected to a number of remove units, which are connected to antennas.

Figure 11:
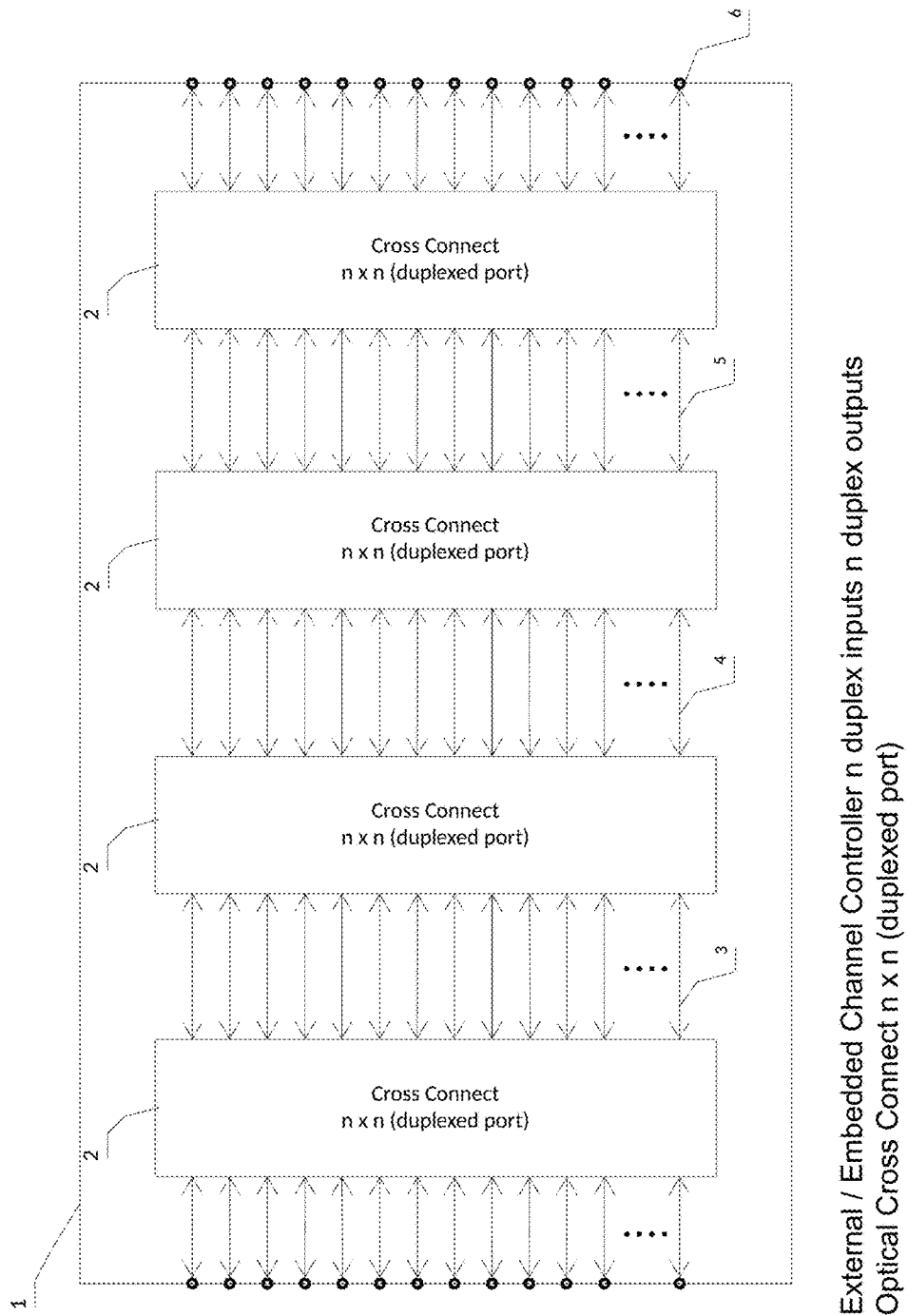
FIG. 11 shows active distributed antenna system channel controller details.

FIG. 11 shows active distributed antenna system channel controller details.

Components for FIG. 11 include:

1. External or Embedded Channel Controller n duplex inputs n duplex outputs.
2. Optical Cross Connect n×n (duplexed port).
3. Delay lines (fine adjustment stage 1).
4. Delay lines (fine adjustment stage 2).
5. Delay lines (coarse adjustment stage 1).
6. Duplex Port.

In FIG. 11, a number of cross connect circuits or blocks are connected in a daisy-chained configuration.

Figure 12A:
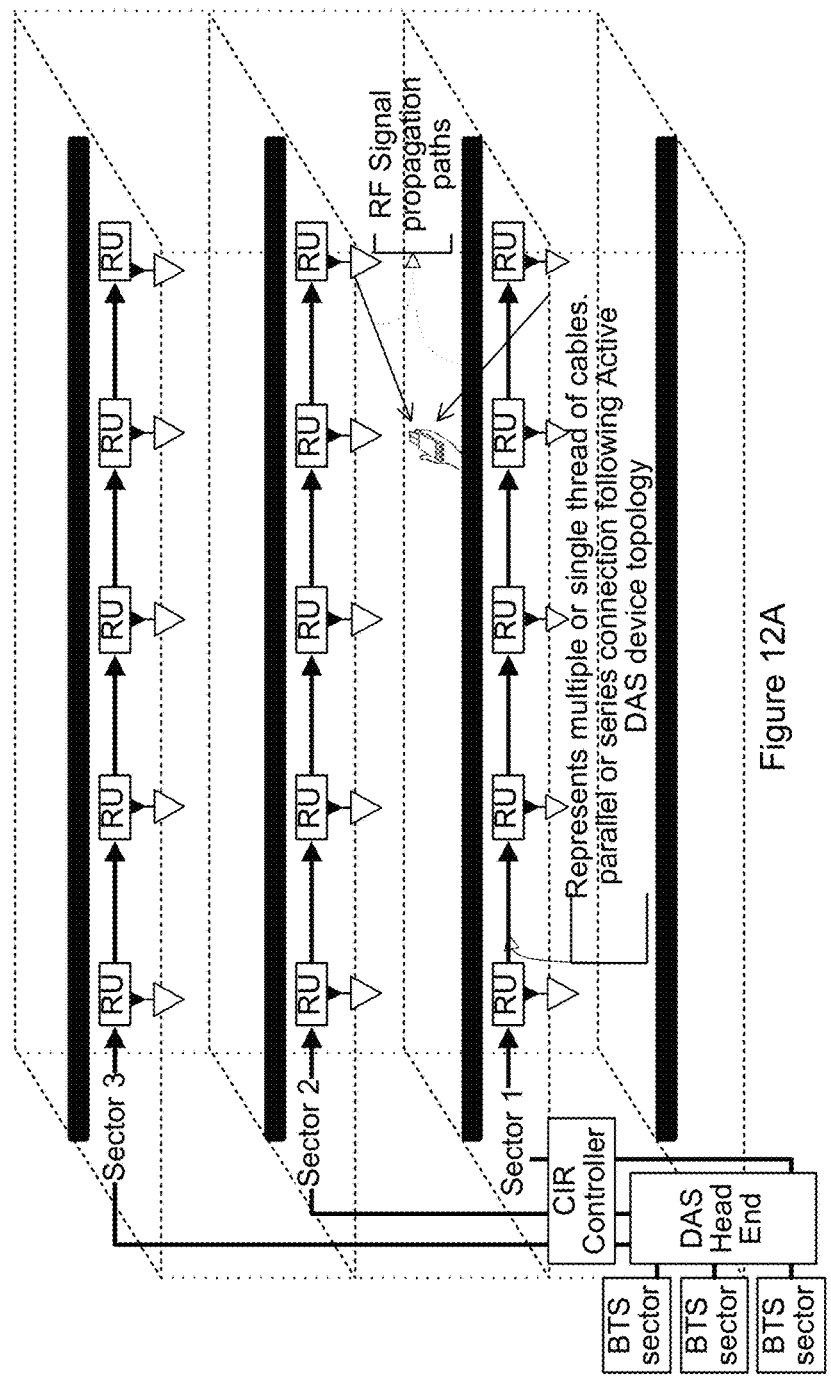
FIGS. 12A-12B show when using a distributed antenna system channel controller there is no need to change the route of cabling and hence solve a real installation and implementation problem.
Figure 12B:
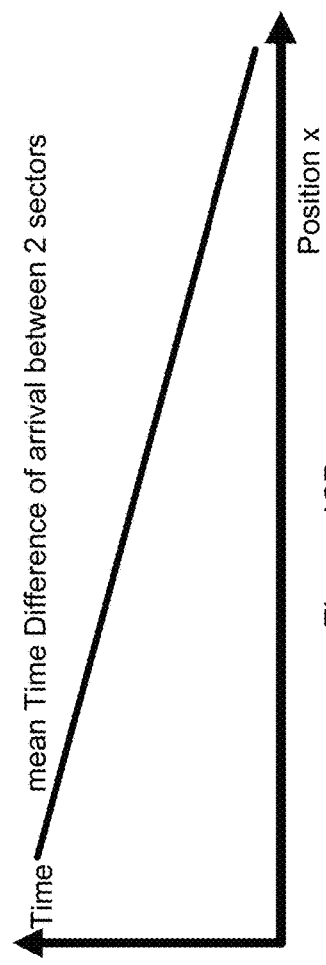

FIGS. 12A-12B show when using a distributed antenna system channel controller there is no need to change the route of cabling and hence solve a real installation and implementation problem.

FIG. 12A shows an organization or positioning of receiving units and antennas within a structure, such as a multi-story building. For example, there are three sectors, which can represent three different floors. FIG. 12B shows diagram of timing versus position, indicating a mean time difference of arrival between two sectors.

Multiple cables method for passive design using coaxial cables. Multiple propagation velocity factor cables are used within a single installation to produce the desired CIR. The type of cable is selected to produce the maximum time stretching between adjacent antennas in the same floor based on the designer choice.

Different cable types for typical floors setup provides unique fingerprint to each floor. The same concept applies for active DAS with different fiber cable types producing different speeds of light.

Figure 13:
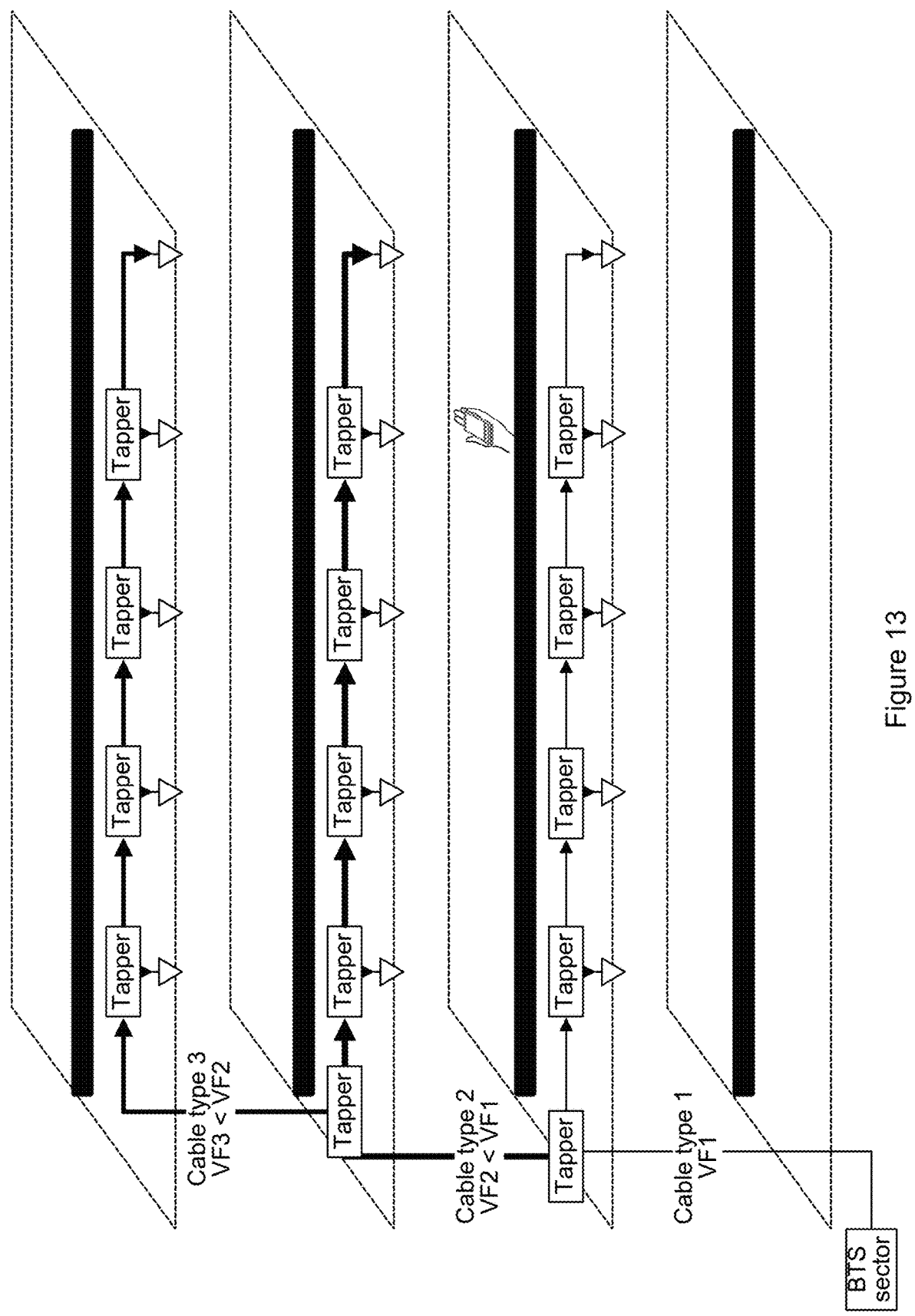
FIG. 13 shows different fiber refractive index method.

FIG. 13 shows different fiber refractive index method. Using a high refractive index fiber in an installation will allow for increased time stretching between different transmitters. In star configuration a mix of cables can be used to allow for control over propagation time. The velocity factor of propagation in fiber cables are related to the refractive index of the fiber.

Additionally, using a higher refractive index fiber in one installation will guarantee a higher time stretching. Adding a second or third type of optical fiber cables with different refractive indexes allow for more time stretching.

Some selection of cables types has n=2.5 or n=1.5 or any available refractive index.

Figure 14:
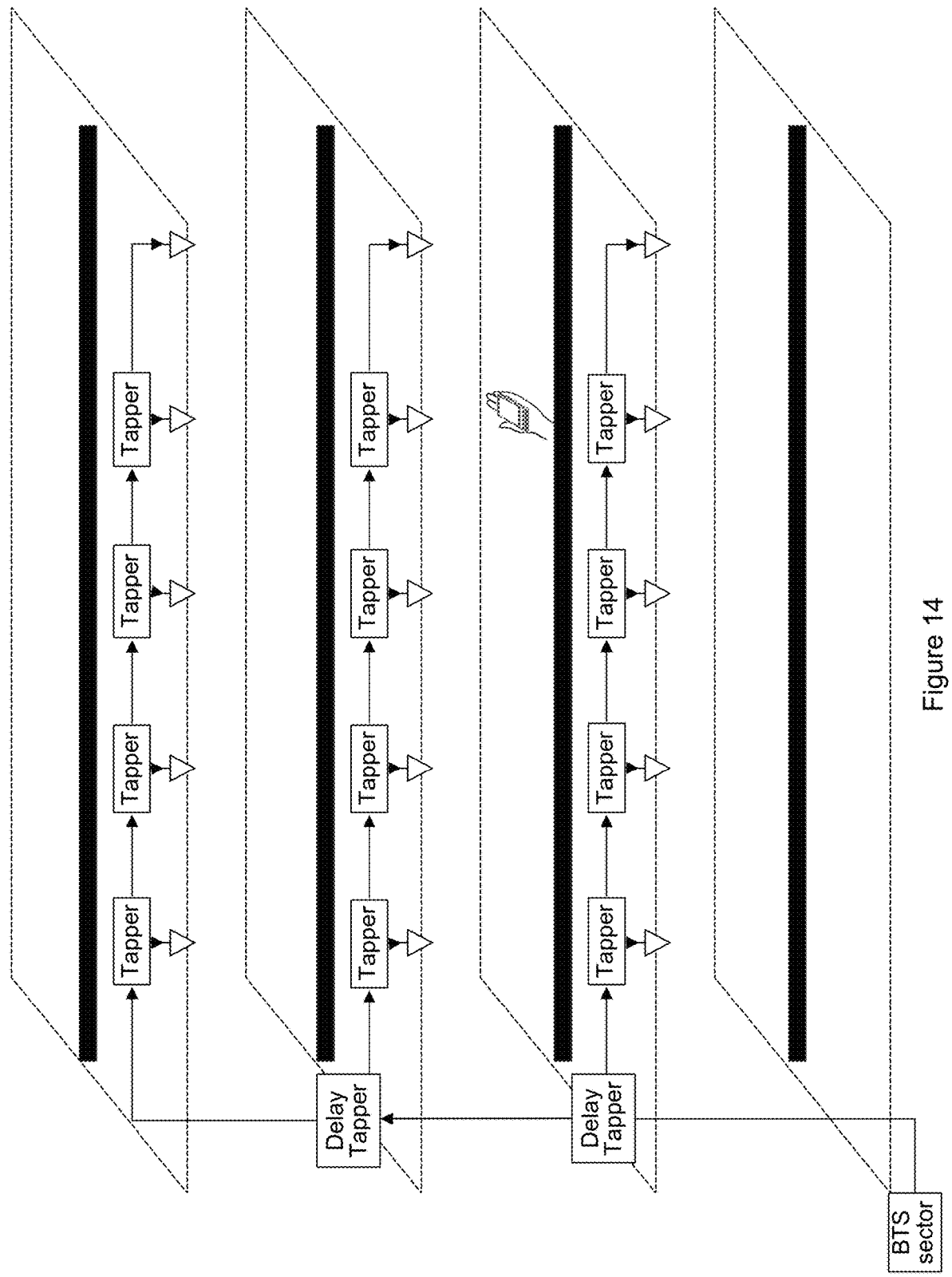
FIG. 14 shows hardware delay tapper or power divider method.

FIG. 14 shows hardware delay tapper or power divider method. A physical delay hardware tapper introduces a fixed delay to one side only of the signal output to delay the signal in that particular branch with a predetermined delay value.

Measurement, monitoring, and control system. A special monitoring and control hardware board embedded into the DAS channel controller described above and DAS system in different points continuously produce a test signal outside the communication band to monitor any changes in the cable length. Compares the value with stored baseline values of cable lengths to trigger an alarm when these values are changed for all connected signal paths. The system will have the following components and functions.

Bidirectional distributed channel estimation and sounding with location logging includes:

1.1. One Direction 1.1.1. Single TX→Multiple Transmit Antenna→over the air channel→Single RX antenna→Channel sounder receiver.

1.1.2. Single TX→Single Transmit Antenna→over the air channel→Multiple RX antenna→single RX receiver.

1.2. Round Trip Channel Sounding of the overall complete indoor area:

1.2.1. Single TX→Multiple Transmit Antenna→over the air channel→Reflection back from indoor channel to the same Antennas→returned values to the same Transmitter location over the same channel where an RX is collocated 1.3. Round Trip Channel Sounding of a Single point in indoor space space:

1.3.1. Single TX→Multiple Transmit Antenna→over the air channel→RF repeater device (emulating the user equipment at a defined point)→over the air channel→multiple antenna to a co-located Single RX.

FIG. 15 shows distributed antenna system sounder interaction with a distributed antenna system. External and internal parts of the channel sounder performs continues tests on fiber, coaxial, and over the air channel components with result correlated to a physical position.

Independent Location logger channel sounder. Channel anomaly detection and reporting. (physical change on infrastructure). Calibration and auto adjust of the delays to deliver required CIR per location in an automated procedure at infrastructure commissioning stage and adjusting phase for baseline creation.

Functions of the DAS Sounder can include: DAS channel sounder in downlink with location logging. DAS channel sounder in uplink with location logging. Collective uplink and downlink channel sounding using frequency translation and retransmission in a transceiver (TRx2) with location logging. Works with any type of DAS; passive, active, and hybrid.

Components for FIG. 15 include:
1. DAS Sounder Transceiver (TRx).
2. DAS head end equipment and hubs.
3. Duplex cable pairs (two core for uplink and downlink communication).
4. Channel controller. External or integrated with DAS head end (first stage)
5. DAS.
6. Channel Controller. External or integrated with DAS HUB (2nd stage).
7. Duplex cable pair or any other medium of transmission implemented in DAS
hub (coaxial, twisted pair, and others)
8. DAS RF remote unit connected to DAS hub.
9. DAS antenna connected to Remote unit using coaxial cable.
10. DAS RF remote unit connected directly to first controller level.
11. Coaxial cables.

In FIG. 15, a DAS sounder is connected to DAS head equipment and hubs via cable (e.g., copper wire). The DAS head equipment is connected via fiber to the controller with n duplex inputs and n duplex outputs. The DAS channel controller is connected to a number of DAS hubs. A DAS hub is connected to another DAS controller (having n duplex inputs and n duplex outputs), which is connected to a number of remove units, which are connected to antennas. A DAS sounder transceiver (TRx2) with location logging can transmit and receive wireless (e.g., via a RF signal propagation path) to the antennas connected to the remote units.

Continuous feedback and adjusting process. Post processing of collected results applying machine learning algorithms to simplify pattern matching and detection algorithms.

Live adjustment of detection database.

Fingerprint database. Live detection of coverage quality and reporting of anomaly with location.

Location antenna patch. An RF power harvesting device is patched to DAS antenna. Transmitting an RF beacon signal to identify an antenna. The power harvesting mechanism is built over the Transmitted Power from the serving antenna. In other versions or options it can harvest power from light or power supplied via power over Ethernet. The patch can have an optional short life battery.

Harvest antenna RF signal power. Transmits a periodic coded signal containing the beacon ID and identifying parameters. The coded signal can be encrypted to eliminate the possibility of cloning the beacon data or rouge beacons.

A database of the coded beacon IDs and encrypted message keys and installation locations is maintained in a core network.

Mobile handsets read the beacon ID, when a distress call is initiated for example, and transmit them back to the location server in the mobile network using a Secure User Plane Location (SUPL) protocol. The transmitted data can also be communicated via a smartphone application or app or via the operating system to the location database.

The database returns back the location of the user as a response to the lookup request.

Same patch can serve as a standard location and proximity beacon with harvesting option.

The same patch reports back to the servers, through a gateway device and mesh network, the status of the nearby antenna. If the antenna is not transmitting power as per the baseline value, an alarm is triggered at the monitoring server to initiate a maintenance request. Serving as a mobile service monitoring device as well as proximity and location beacon with asset tracking functionality.

To maintain the previously described network based methods of localization, the RF signal output of the DAS is also monitored to make sure the channel characteristics are maintained as per the designed values. The channel characteristic is subject to change if one of the antennas in the DAS system is malfunction. The patch will report back to the server via an independent mesh and network connection that a particular antenna is not transmitting. This will allow the server to dynamically recalculate and update the CIR to adjust the lookup tables for the affected location. Any subsequent location requests from the affected area will have the most appropriate response depending on the new CIR. If there is no possible ambiguity in the new calculated CIR the results will be accurate. However the mobile signal levels should be fixed to maintain the proper coverage in case the simulation shows a possible ambiguity with other locations. The location response will be flagged accordingly with the other locations and an immediate request to fix the antenna issues will be sent to concerned parties.

There can be a dynamic recovery of the lookup tables in case of a signal loss of any of the antennas. When the patch monitoring the antenna coverage detects a signal loss of one of the antennas. This will trigger simulation of the lookup database to produce new set of data for lookup.

Software and simulation tools. A part of the previously described methods of location is the ability to simulate and emulate the actual performance of the system in both the design phase and the dynamic update operation of the system. Software tools are part of the system to implement and aid in the design will have the below software components and algorithms.
  1. Design tools
    1.1. RF propagation simulation software with channel impulse response simulation and DAS hardware delay database.
      1.1.1. Database of coaxial cable loss and delay
      1.1.2. Database of wall loss and delay
      1.1.3. Ray tracing propagation algorithms with Wall loss and phase shift calculations
      1.1.4. Ray tracing and propagation algorithms with superposition of CIR considering accumulated Transmit delays of all antennas in the region
      1.1.5. Simulate and generate delay profiles for different location
      1.1.6. Simulate and generate CIR profiles for different locations.
    1.2. Automation algorithm to suggest best design methodology out of the described methods to achieve clear location information with minimum modification
    1.3. Automate the Elimination detection ambiguity
    1.4. Simulate LBS accuracy and CIR based on a given design.
    1.5. Simulate LBS accuracy and CIR Based on Technology specific detection methods (e.g., 3G, WCDMA, CDMA, LTE) for a given design
    1.6. Simulate all described methods above with all readings per location
    1.7. Optimize the design to minimize needed modifications on existing infrastructure and installation cost and material.
    1.8. Prepopulate the location database with initial information needed for location lookup of each technology
    1.9. Simulate database lookup time and efficiency.
  2. Software tools and algorithms to simulate and reconstruct CIR from channel sounder DATA for the following cases
    2.1. One Direction
      2.1.1. Single TX→Multiple Transmit Antenna→over the air channel→2.1.2. Single RX antenna→Channel sounder receiver.
      2.1.2. Single TX→Single Transmit Antenna→over the air channel→Multiple RX antenna→single RX receiver.
    2.2. Round Trip Channel Sounding of the overall complete indoor area:
      2.1.2. Single TX→Multiple Transmit Antenna→over the air channel→Reflection back from indoor channel to the same Antennas→returned values to the same Transmitter location over the same channel where an RX is collocated
    2.3. Round Trip Channel Sounding of a Single point in indoor space space:
      2.3.1. Single TX→Multiple Transmit Antenna→over the air channel→RF repeater device (emulating the user equipment at a defined point)→over the air channel→multiple antenna to a co-located Single RX.
    2.4. Software to super impose individual channel sounding results of individual antennas on TX and RX to reconstruct actual CIR
  3. Location database and management tools
    3.1. Optimization modules for location-based services.
    3.2. Dynamic update of the database
    3.3. lookup time minimization techniques
    3.4. Machine learning algorithms to extract service coverage data anomalies.
    3.5. Manage installed devices including patch devices and channel controller This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
   a first antenna, positioned at a first location inside a building;
   a second antenna, positioned at a second location inside the building;
   a channel controller, comprising a first input, a second input, and an output, wherein the first antenna is coupled to the first input, and the second antenna is coupled to a second input,
   the channel controller comprises a first configurable delay between the first input to the output, a second configurable delay between the second input to the output, and the first configurable delay is selected to be different from the second configurable delay, and
   when the channel controller detects a signal loss of any of the antennas, triggering simulation of a lookup database to produce new set of data for lookup; and
   a receiver circuit, wherein the receiver circuit receives the output of the channel controller comprising a signal from the first antenna including the first configurable delay and a signal from the second antenna including the second configurable delay,
   based on the received first configurable delay, the receiver circuit determines a signal is from the first antenna at the first location inside the building, and
   based on the received second configurable delay, the receiver circuit determines a signal is from the second antenna at the second location inside the building.

2. The system of claim 1 wherein the first signal and second signal are radio frequency signals.

3. The system of claim 1 wherein the first configurable delay and second configurable delay are configured by a user.

4. The system of claim 1 wherein the first configurable delay and second configurable delay are created without introducing a physical delay via varying cable lengths.

5. The system of claim 1 wherein the first configurable delay and second configurable delay are created by way of a digital delay by way of using a digital signal processor integrated circuit or field programmable gate array integrated circuit.

6. The system of claim 1 wherein the first configurable delay and the second configurable delay do not minimize a multipath effect between the first antenna and the second antenna.

7. The system of claim 1 wherein the channel controller continuously produces a test signal outside the communication band to monitor any changes in the cable length.

8. The system of claim 7 wherein the channel controller compares a value with stored baseline values of cable lengths to trigger an alarm when these values are changed for all connected signal paths.

9. The system of claim 1 comprising:
a channel sounder circuit, wherein the channel sounder circuit wirelessly interacts with the channel controller and receiver circuit, performing continuous tests on fiber, coaxial, and over the air channel components with results correlated to a physical position.

10. The system of claim 1 comprising:
a location logger channel sounder, wherein the location logger channel sounder detects channel anomaly and reports a physical change on infrastructure.

11. The system of claim 10 wherein based on the location logger channel sounder, the channel controller can calibrate and auto adjust based on delays to deliver a desired channel impulse response (CIR) per location via an automated procedure at infrastructure commissioning stage and adjusting phase for baseline creation.

12. The system of claim 1 comprising:
a distributed antenna system (DAS) channel sounder in downlink with location logging and a DAS channel sounder in uplink with location logging, wherein a collective uplink and downlink channel sounding using frequency translation and retransmission in a transceiver with location logging.

13. The system of claim 1 comprising:
distributed antenna system (DAS) software design tools, wherein the DAS software design tools assist in a positioning of the antennas.

14. The system of claim 1 comprising:
hardware tools and digital software methods, wherein the hardware tools and digital software methods implement recommended delays on the transmission antennas.

15. The system of claim 1 wherein the first location and second location are on different floors of the building.

16. The system of claim 1 comprising:
a location logger channel sounder, wherein the location logger channel sounder monitors a channel impulse response and reports a physical change on infrastructure.

17. The system of claim 16 wherein based on the location logger channel sounder, the channel controller can calibrate and auto adjust delays based on a plurality of channel impulse response measurements to deliver a desired channel impulse response per location via an automated procedure at an infrastructure commissioning stage and an adjusting phase for baseline creation.

18. The system of claim 1 comprising:
distributed antenna system (DAS) software design tools, wherein the DAS software design tools assists in simulation of channel impulse response per location.

19. The system of claim 18 wherein DAS software design tools utilize collected data from a channel sounder circuit from individual or multiple antennas to reconstruct a channel impulse response without needing to deploy all antennas of the DAS.

20. The system of claim 1 comprising:
distributed antenna system (DAS) software design tools, wherein the DAS software design tools assist in generating the lookup database.

21. The system of claim 1 wherein a dynamic update of the lookup database is triggered by any reported service loss on an individual antenna, causing a re-simulation of lookup values and update of the lookup database.

22. The system of claim 1 comprising:
distributed antenna system (DAS) software design tools, wherein the DAS software design tools assist in eliminating an ambiguity and providing a one-to-one mapping of a set of monitored features of a channel against its logical location.

23. A system comprising:
a first antenna, positioned at a first location inside a building;
a second antenna, positioned at a second location inside the building;
a channel controller, comprising a first input, a second input, and an output, wherein the first antenna is coupled to the first input, and the second antenna coupled to a second input,
the channel controller comprises a first configurable delay between the first input to the output, a second configurable delay between the second input to the output, and the first configurable delay is selected to be different from the second configurable delay, and
the channel controller continuously produces a test signal outside a communication band to monitor any changes in a cable length, and the channel controller compares a value with stored baseline values of cable lengths to trigger an alarm when these values are changed for all connected signal paths; and
a receiver circuit, wherein the receiver circuit receives the output of the channel controller comprising a signal from the first antenna including the first configurable delay and a signal from the second antenna including the second configurable delay,
based on the received first configurable delay, the receiver circuit determines a signal is from the first antenna at the first location inside the building, and
based on the received second configurable delay, the receiver circuit determines a signal is from the second antenna at the second location inside the building.

24. The system of claim 23 wherein the first signal and second signal are radio frequency signals.

25. The system of claim 23 wherein the first configurable delay and second configurable delay are configured by a user.

26. The system of claim 23 wherein the first configurable delay and second configurable delay are created without introducing a physical delay via varying cable lengths.

27. The system of claim 23 wherein the first configurable delay and second configurable delay are created by way of a digital delay by way of using a digital signal processor integrated circuit or field programmable gate array integrated circuit.

28. The system of claim 23 wherein the first configurable delay and the second configurable delay do not minimize a multipath effect between the first antenna and the second antenna.

29. The system of claim 23 comprising:
a channel sounder circuit, wherein the channel sounder circuit wirelessly interacts with the channel controller and receiver circuit, performing continuous tests on fiber, coaxial, and over the air channel components with results correlated to a physical position.

30. The system of claim 23 comprising:
a location logger channel sounder, wherein the location logger channel sounder detects channel anomaly and reports a physical change on infrastructure.

31. The system of claim 30 wherein based on the location logger channel sounder, the channel controller can calibrate and auto adjust based on delays to deliver a desired channel impulse response (CIR) per location via an automated procedure at infrastructure commissioning stage and adjusting phase for baseline creation.

32. The system of claim 23 comprising:
a distributed antenna system (DAS) channel sounder in downlink with location logging and a DAS channel sounder in uplink with location logging, wherein a collective uplink and downlink channel sounding using frequency translation and retransmission in a transceiver with location logging.

33. The system of claim 23 comprising:
distributed antenna system (DAS) software design tools, wherein the DAS software design tools assists in a positioning of the antennas.

34. The system of claim 23 comprising:
hardware tools and digital software methods, wherein the hardware tools and digital software methods implement recommended delays on the transmission antennas.

35. The system of claim 23 wherein the first location and second location are on different floors of the building.

36. The system of claim 23 comprising:
a location logger channel sounder, wherein the location logger channel sounder monitors a channel impulse response and reports a physical change on infrastructure.

37. The system of claim 36 wherein based on the location logger channel sounder, the channel controller can calibrate and auto adjust delays based on a plurality of channel impulse response measurements to deliver a desired channel impulse response per location via an automated procedure at an infrastructure commissioning stage and an adjusting phase for baseline creation.

38. The system of claim 23 comprising:
distributed antenna system (DAS) software design tools, wherein the DAS software design tools assists in simulation of channel impulse response per location.

39. The system of claim 38 wherein DAS software design tools utilize collected data from a channel sounder circuit from individual or multiple antennas to reconstruct a channel impulse response without needing to deploy all antennas of the DAS.

40. The system of claim 23 comprising:
distributed antenna system (DAS) software design tools, wherein the DAS software design tools assist in generating a lookup database.

41. The system of claim 23 wherein a dynamic update of a lookup database is triggered by any reported service loss on an individual antenna, causing a re-simulation of lookup values and update of the lookup database.

42. The system of claim 23 comprising:
distributed antenna system (DAS) software design tools, wherein the DAS software design tools assist in eliminating an ambiguity and providing a one-to-one mapping of a set of monitored features of a channel against its logical location.

43. A system comprising:
a first antenna, positioned at a first location inside a building;
a second antenna, positioned at a second location inside the building;
a channel controller, comprising a first input, a second input, and an output, wherein the first antenna is coupled to the first input, and the second antenna is coupled to a second input,
the channel controller comprises a first configurable delay between the first input to the output, a second configurable delay between the second input to the output, and the first configurable delay is selected to be different from the second configurable delay;
a receiver circuit, wherein the receiver circuit receives the output of the channel controller comprising a signal from the first antenna including the first configurable delay and a signal from the second antenna including the second configurable delay,
based on the received first configurable delay, the receiver circuit determines a signal is from the first antenna at the first location inside the building, and
based on the received second configurable delay, the receiver circuit determines a signal is from the second antenna at the second location inside the building
a location logger channel sounder, wherein the location logger channel sounder detects channel anomaly and reports a physical change on infrastructure, and
based on the location logger channel sounder, the channel controller can calibrate and auto adjust based on delays to deliver a desired channel impulse response (CIR) per location via an automated procedure at infrastructure commissioning stage and adjusting phase for baseline creation.

44. The system of claim 43 wherein the first signal and second signal are radio frequency signals.

45. The system of claim 43 wherein the first configurable delay and second configurable delay are configured by a user.

46. The system of claim 43 wherein the first configurable delay and second configurable delay are created without introducing a physical delay via varying cable lengths.

47. The system of claim 43 wherein the first configurable delay and second configurable delay are created by way of a digital delay by way of using a digital signal processor integrated circuit or field programmable gate array integrated circuit.

48. The system of claim 43 wherein the first configurable delay and the second configurable delay do not minimize a multipath effect between the first antenna and the second antenna.

49. The system of claim 43 comprising:
a channel sounder circuit, wherein the channel sounder circuit wirelessly interacts with the channel controller and receiver circuit, performing continuous tests on fiber, coaxial, and over the air channel components with results correlated to a physical position.

50. The system of claim 43 comprising:
a distributed antenna system (DAS) channel sounder in downlink with location logging and a DAS channel sounder in uplink with location logging, wherein a collective uplink and downlink channel sounding using frequency translation and retransmission in a transceiver with location logging.

51. The system of claim 43 comprising:
distributed antenna system (DAS) software design tools, wherein the DAS software design tools assists in a positioning of the antennas.

52. The system of claim 43 comprising:
hardware tools and digital software methods, wherein the hardware tools and digital software methods implement recommended delays on the transmission antennas.

53. The system of claim 43 wherein the first location and second location are on different floors of the building.

54. The system of claim 43 comprising:
a location logger channel sounder, wherein the location logger channel sounder monitors a channel impulse response and reports a physical change on infrastructure.

55. The system of claim 54 wherein based on the location logger channel sounder, the channel controller can calibrate and auto adjust delays based on a plurality of channel impulse response measurements to deliver a desired channel impulse response per location via an automated procedure at an infrastructure commissioning stage and an adjusting phase for baseline creation.

56. The system of claim 43 comprising:
distributed antenna system (DAS) software design tools, wherein the DAS software design tools assists in simulation of channel impulse response per location.

57. The system of claim 56 wherein DAS software design tools utilize collected data from a channel sounder circuit from individual or multiple antennas to reconstruct a channel impulse response without needing to deploy all antennas of the DAS.

58. The system of claim 43 comprising:
distributed antenna system (DAS) software design tools, wherein the DAS software design tools assist in generating a lookup database.

59. The system of claim 43 wherein a dynamic update of a lookup database is triggered by any reported service loss on an individual antenna, causing a re-simulation of lookup values and update of the lookup database.

60. The system of claim 43 comprising:
distributed antenna system (DAS) software design tools, wherein the DAS software design tools assist in eliminating an ambiguity and providing a one-to-one mapping of a set of monitored features of a channel against its logical location.

61. A system comprising:
a first antenna, positioned at a first location inside a building;
a second antenna, positioned at a second location inside the building;
a channel controller, comprising a first input, a second input, and an output, wherein the first antenna is coupled to the first input, and the second antenna is coupled to a second input,
the channel controller comprises a first configurable delay between the first input to the output, a second configurable delay between the second input to the output, and the first configurable delay is selected to be different from the second configurable delay;
a receiver circuit, wherein the receiver circuit receives the output of the channel controller comprising a signal from the first antenna including the first configurable delay and a signal from the second antenna including the second configurable delay,
based on the received first configurable delay, the receiver circuit determines a signal is from the first antenna at the first location inside the building, and
based on the received second configurable delay, the receiver circuit determines a signal is from the second antenna at the second location inside the building; and
a channel sounder circuit, wherein the channel sounder circuit wirelessly interacts with the channel controller and receiver circuit, performing continuous tests on fiber, coaxial, and over the air channel components with results correlated to a physical position.

62. The system of claim 61 wherein the first signal and second signal are radio frequency signals.

63. The system of claim 61 wherein the first configurable delay and second configurable delay are configured by a user.

64. The system of claim 61 wherein the first configurable delay and second configurable delay are created without introducing a physical delay via varying cable lengths.

65. The system of claim 61 wherein the first configurable delay and second configurable delay are created by way of a digital delay by way of using a digital signal processor integrated circuit or field programmable gate array integrated circuit.

66. The system of claim 61 wherein the first configurable delay and the second configurable delay do not minimize a multipath effect between the first antenna and the second antenna.

67. The system of claim 61 comprising:
a distributed antenna system (DAS) channel sounder in downlink with location logging and a DAS channel sounder in uplink with location logging, wherein a collective uplink and downlink channel sounding using frequency translation and retransmission in transceiver with location logging.

68. The system of claim 61 comprising:
distributed antenna system (DAS) software design tools, wherein the DAS software design tools assists in a positioning of the antennas.

69. The system of claim 61 comprising:
hardware tools and digital software methods, wherein the hardware tools and digital software methods implement recommended delays on the transmission antennas.

70. The system of claim 61 wherein the first location and second location are on different floors of the building.

71. The system of claim 61 comprising:
a location logger channel sounder, wherein the location logger channel sounder monitors a channel impulse response and reports a physical change on infrastructure.

72. The system of claim 71 wherein based on the location logger channel sounder, the channel controller can calibrate and auto adjust delays based on a plurality of channel impulse response measurements to deliver a desired channel impulse response per location via an automated procedure at an infrastructure commissioning stage and an adjusting phase for baseline creation.

73. The system of claim 61 comprising:
distributed antenna system (DAS) software design tools, wherein the DAS software design tools assists in simulation of channel impulse response per location.

74. The system of claim 73 wherein DAS software design tools utilize collected data from a channel sounder circuit from individual or multiple antennas to reconstruct a channel impulse response without needing to deploy all antennas of the DAS.

75. The system of claim 61 comprising:
distributed antenna system (DAS) software design tools, wherein the DAS software design tools assist in generating a lookup database.

76. The system of claim 61 wherein a dynamic update of a lookup database is triggered by any reported service loss on an individual antenna, causing a re-simulation of lookup values and update of the lookup database.

77. The system of claim 61 comprising:
distributed antenna system (DAS) software design tools, wherein the DAS software design tools assist in eliminating an ambiguity and providing a one-to-one mapping of a set of monitored features of a channel against its logical location.

\* \* \* \* \*